United States Patent
Kummer et al.

(10) Patent No.: US 8,959,544 B2
(45) Date of Patent: Feb. 17, 2015

(54) DESCRAMBLING OF MULTIPLE TELEVISION CHANNELS

(71) Applicant: EchoStar Technologies L.L.C., Englewood, CO (US)

(72) Inventors: David Kummer, Highlands Ranch, CO (US); Germar Schaefer, Monument, CO (US)

(73) Assignee: Echostar Technologies L.L.C., Englewood, CA (US)

(*) Notice: Subject to any disclaimer, the term of this patent is extended or adjusted under 35 U.S.C. 154(b) by 30 days.

(21) Appl. No.: 13/757,168

(22) Filed: Feb. 1, 2013

(65) Prior Publication Data

US 2013/0247089 A1  Sep. 19, 2013

Related U.S. Application Data

(60) Provisional application No. 61/740,807, filed on Dec. 21, 2012, provisional application No. 61/611,483, filed on Mar. 15, 2012.

(51) Int. Cl.
*H04N 7/167* (2011.01)
*H04N 7/173* (2011.01)
(Continued)

(52) U.S. Cl.
CPC ..... *H04N 21/4508* (2013.01); *H04N 21/26606* (2013.01); *H04H 60/14* (2013.01);
(Continued)

(58) Field of Classification Search
USPC ........................................... 725/31, 131, 135
See application file for complete search history.

(56) References Cited

U.S. PATENT DOCUMENTS 4,706,121 A   11/1987  Young
4,723,246 A    2/1988  Weldon, Jr.
(Continued)

FOREIGN PATENT DOCUMENTS

EP   0 903 743 A   3/1999
EP   0 973 333 A   1/2000
(Continued)

OTHER PUBLICATIONS

U.S. Appl. No. 13/795,914, filed Mar. 6, 2013, Non-Final Office Action mailed Oct. 11, 2013, 17 pages.
(Continued)

*Primary Examiner* — Pankaj Kumar
*Assistant Examiner* — Franklin Andramuno
(74) *Attorney, Agent, or Firm* — Kilpatrick Townsend & Stockton LLP

(57) ABSTRACT

Various arrangements for descrambling multiple television channels concurrently are presented. A set-top box may receive a first plurality of television channels as scrambled data packets. A previously-received locally-stored networking information table may be accessed that associates each of the multiple television channels with the same entitlement control message, as indicated by a packet identifier. An entitlement control message having the same packet identifier may be received. A smartcard may be used to decrypt the entitlement control message having the same packet identifier to obtain a first control word and a second control word. Scrambled data packets corresponding to the multiple television channels may be descrambled using the first control word and the second control word. These television channels may be stored and/or output for presentation by the set-top box.

20 Claims, 7 Drawing Sheets

(51) Int. Cl.
- *H04N 7/16* (2011.01)
- *H04N 21/45* (2011.01)
- *H04N 21/266* (2011.01)
- *H04H 60/14* (2008.01)
- *H04N 21/434* (2011.01)
- *H04N 21/4405* (2011.01)
- *H04N 21/4623* (2011.01)
- *H04N 21/462* (2011.01)

(52) U.S. Cl.
CPC ....... *H04N21/4345* (2013.01); *H04N 21/4405* (2013.01); *H04N 21/4622* (2013.01); *H04N 21/4623* (2013.01)
USPC .............................. 725/31; 725/131; 725/135

(56) References Cited

U.S. PATENT DOCUMENTS

| | | | |
|---|---|---|---|
| 4,802,215 | A | 1/1989 | Mason |
| 5,187,589 | A | 2/1993 | Kono et al. |
| 5,335,277 | A | 8/1994 | Harvey et al. |
| 5,483,277 | A | 1/1996 | Granger |
| 5,488,658 | A | 1/1996 | Hirashima |
| 5,541,738 | A | 7/1996 | Mankovitz |
| 5,642,153 | A | 6/1997 | Chaney et al. |
| 5,684,969 | A | 11/1997 | Ishida |
| 5,805,763 | A | 9/1998 | Lawler et al. |
| 5,974,218 | A | 10/1999 | Nagasaka et al. |
| 6,628,891 | B1 | 9/2003 | Vantalon et al. |
| 6,701,528 | B1 | 3/2004 | Arsenault et al. |
| 6,766,523 | B2 | 7/2004 | Herley |
| 6,798,971 | B2 | 9/2004 | Potrebic |
| 6,938,208 | B2 | 8/2005 | Reichardt |
| 7,024,676 | B1 | 4/2006 | Klopfenstein |
| 7,409,140 | B2 | 8/2008 | Rodriguez et al. |
| 7,487,529 | B1 | 2/2009 | Orlick |
| 7,490,169 | B1 | 2/2009 | Ogdon et al. |
| 7,493,312 | B2 | 2/2009 | Liu et al. |
| 7,542,656 | B2 | 6/2009 | Cho et al. |
| 7,577,751 | B2 | 8/2009 | Vinson et al. |
| 7,590,993 | B1 | 9/2009 | Hendricks et al. |
| 7,715,552 | B2 | 5/2010 | Pinder et al. |
| 7,730,517 | B1 | 6/2010 | Rey et al. |
| 7,739,711 | B2 | 6/2010 | Finseth et al. |
| 7,760,986 | B2 | 7/2010 | Beuque |
| 7,804,861 | B2 | 9/2010 | Kim |
| 7,848,618 | B2 | 12/2010 | Potrebic et al. |
| 7,856,557 | B2 | 12/2010 | Beuque |
| 7,926,078 | B2 | 4/2011 | Arsenault et al. |
| 7,929,697 | B2 | 4/2011 | McNeely et al. |
| 7,962,937 | B2 | 6/2011 | Cho et al. |
| 8,006,268 | B2 | 8/2011 | Sloo |
| 8,201,194 | B2 | 6/2012 | Wijnands et al. |
| 8,321,466 | B2 | 11/2012 | Black et al. |
| 8,437,622 | B2 | 5/2013 | Casagrande |
| 8,447,170 | B2 | 5/2013 | Casagrande |
| 8,566,873 | B2 | 10/2013 | Sie et al. |
| 8,584,167 | B2 | 11/2013 | Vanduyn |
| 8,606,088 | B2 | 12/2013 | Kummer et al. |
| 8,627,349 | B2 | 1/2014 | Kirby et al. |
| 8,660,412 | B2 | 2/2014 | Kummer et al. |
| 8,774,608 | B2 | 7/2014 | Kummer et al. |
| 8,819,722 | B2 | 8/2014 | Kummer et al. |
| 8,850,476 | B2 | 9/2014 | VanDuyn et al. |
| 2001/0028782 | A1 | 10/2001 | Ohno et al. |
| 2001/0033736 | A1 | 10/2001 | Yap et al. |
| 2001/0034787 | A1 | 10/2001 | Takao et al. |
| 2002/0044658 | A1 | 4/2002 | Wasilewski et al. |
| 2002/0054752 | A1 | 5/2002 | Wood et al. |
| 2002/0055343 | A1 | 5/2002 | Stetzler et al. |
| 2002/0087983 | A1 | 7/2002 | Son et al. |
| 2002/0092021 | A1 | 7/2002 | Yap et al. |
| 2002/0095510 | A1 | 7/2002 | Sie et al. |
| 2002/0097340 | A1 | 7/2002 | Takagi et al. |
| 2002/0144266 | A1 | 10/2002 | Goldman et al. |
| 2002/0152299 | A1 | 10/2002 | Traversat et al. |
| 2002/0164147 | A1 | 11/2002 | Suda |
| 2002/0168178 | A1 | 11/2002 | Rodriguez et al. |
| 2002/0188943 | A1 | 12/2002 | Freeman et al. |
| 2003/0026423 | A1 | 2/2003 | Unger et al. |
| 2003/0110514 | A1 | 6/2003 | West et al. |
| 2003/0177495 | A1 | 9/2003 | Needham et al. |
| 2003/0200548 | A1 | 10/2003 | Baran et al. |
| 2003/0208763 | A1 | 11/2003 | McElhatten et al. |
| 2004/0001087 | A1 | 1/2004 | Warmus et al. |
| 2004/0015992 | A1 | 1/2004 | Hasegawa et al. |
| 2004/0015999 | A1 | 1/2004 | Carlucci et al. |
| 2004/0103428 | A1 | 5/2004 | Seok et al. |
| 2004/0162871 | A1 | 8/2004 | Pabla et al. |
| 2004/0218905 | A1 | 11/2004 | Green et al. |
| 2004/0242150 | A1 | 12/2004 | Wright et al. |
| 2004/0268387 | A1 | 12/2004 | Wendling |
| 2005/0120049 | A1 | 6/2005 | Kanegae et al. |
| 2005/0125683 | A1 | 6/2005 | Matsuyama et al. |
| 2005/0229213 | A1 | 10/2005 | Ellis et al. |
| 2005/0271365 | A1 | 12/2005 | Hisatomi |
| 2006/0056800 | A1 | 3/2006 | Shimagami et al. |
| 2006/0206819 | A1 | 9/2006 | Tsuji et al. |
| 2006/0212900 | A1 | 9/2006 | Ismail et al. |
| 2006/0215993 | A1 | 9/2006 | Yamada |
| 2006/0274208 | A1 | 12/2006 | Pedlow, Jr. |
| 2007/0016546 | A1 | 1/2007 | De Vorchik et al. |
| 2007/0039032 | A1 | 2/2007 | Goldey et al. |
| 2007/0061378 | A1 | 3/2007 | Lee et al. |
| 2007/0157253 | A1 | 7/2007 | Ellis et al. |
| 2007/0165855 | A1 | 7/2007 | Inui |
| 2007/0192586 | A1 | 8/2007 | McNeely |
| 2007/0204288 | A1 | 8/2007 | Candelore |
| 2007/0234395 | A1* | 10/2007 | Dureau et al. ................. 725/135 |
| 2007/0258596 | A1 | 11/2007 | Kahn et al. |
| 2008/0046929 | A1 | 2/2008 | Cho et al. |
| 2008/0092164 | A1 | 4/2008 | Agarwal et al. |
| 2008/0104534 | A1 | 5/2008 | Park et al. |
| 2008/0137850 | A1* | 6/2008 | Mamidwar ................... 380/202 |
| 2008/0141322 | A1 | 6/2008 | Jang et al. |
| 2008/0152039 | A1 | 6/2008 | Shah et al. |
| 2008/0184327 | A1 | 7/2008 | Ellis et al. |
| 2008/0216119 | A1 | 9/2008 | Pfeffer et al. |
| 2008/0216136 | A1 | 9/2008 | Pfeffer et al. |
| 2008/0222681 | A1 | 9/2008 | Kwon |
| 2008/0271077 | A1 | 10/2008 | Kim et al. |
| 2008/0273698 | A1 | 11/2008 | Manders et al. |
| 2008/0276284 | A1 | 11/2008 | Bumgardner et al. |
| 2008/0288461 | A1 | 11/2008 | Glennon et al. |
| 2008/0291206 | A1 | 11/2008 | Uchimura et al. |
| 2008/0298585 | A1 | 12/2008 | Maillard et al. |
| 2008/0301740 | A1 | 12/2008 | Tsutsui |
| 2009/0051579 | A1 | 2/2009 | Inaba et al. |
| 2009/0067621 | A9 | 3/2009 | Wajs |
| 2009/0080930 | A1 | 3/2009 | Shinotsuka et al. |
| 2009/0100466 | A1 | 4/2009 | Migos |
| 2009/0165057 | A1 | 6/2009 | Miller et al. |
| 2009/0172722 | A1 | 7/2009 | Kahn et al. |
| 2009/0178098 | A1 | 7/2009 | Westbrook et al. |
| 2009/0254962 | A1 | 10/2009 | Hendricks et al. |
| 2009/0260038 | A1 | 10/2009 | Acton et al. |
| 2009/0320073 | A1 | 12/2009 | Reisman |
| 2010/0020794 | A1 | 1/2010 | Cholas et al. |
| 2010/0037282 | A1* | 2/2010 | Iwata et al. ................... 725/131 |
| 2010/0050225 | A1 | 2/2010 | Bennett |
| 2010/0086277 | A1 | 4/2010 | Craner |
| 2010/0100899 | A1 | 4/2010 | Bradbury et al. |
| 2010/0115121 | A1 | 5/2010 | Roos et al. |
| 2010/0135639 | A1 | 6/2010 | Ellis et al. |
| 2010/0158479 | A1 | 6/2010 | Craner |
| 2010/0158480 | A1 | 6/2010 | Jung et al. |
| 2010/0169926 | A1 | 7/2010 | Westberg et al. |
| 2010/0195827 | A1* | 8/2010 | Lee et al. ...................... 380/200 |
| 2010/0239228 | A1 | 9/2010 | Sano |
| 2010/0247067 | A1 | 9/2010 | Gratton |
| 2010/0265391 | A1 | 10/2010 | Muramatsu et al. |
| 2010/0284537 | A1 | 11/2010 | Inbar |
| 2010/0313222 | A1 | 12/2010 | Lee et al. |
| 2011/0001879 | A1 | 1/2011 | Goldey et al. |

(56) References Cited

U.S. PATENT DOCUMENTS

| | | | |
|---|---|---|---|
| 2011/0007218 A1 | 1/2011 | Moran et al. |
| 2011/0043652 A1 | 2/2011 | King et al. |
| 2011/0078750 A1 | 3/2011 | Tam et al. |
| 2011/0131413 A1 | 6/2011 | Moon et al. |
| 2011/0138169 A1 | 6/2011 | Michel |
| 2011/0162011 A1 | 6/2011 | Hassell et al. |
| 2011/0179453 A1 | 7/2011 | Poniatowski |
| 2011/0225616 A1 | 9/2011 | Ellis |
| 2011/0255002 A1 | 10/2011 | Witheiler |
| 2011/0311045 A1 | 12/2011 | Candelore et al. |
| 2012/0278837 A1 | 11/2012 | Curtis et al. |
| 2012/0296745 A1 | 11/2012 | Harper et al. |
| 2012/0311534 A1 | 12/2012 | Fox et al. |
| 2012/0311634 A1 | 12/2012 | Van Duyn |
| 2013/0014146 A1 | 1/2013 | Bhatia et al. |
| 2013/0051555 A1 | 2/2013 | Martch et al. |
| 2013/0051758 A1 | 2/2013 | Kummer et al. |
| 2013/0051764 A1 | 2/2013 | Casagrande |
| 2013/0051766 A1 | 2/2013 | Martch et al. |
| 2013/0051773 A1 | 2/2013 | Casagrande |
| 2013/0054579 A1 | 2/2013 | Kennedy |
| 2013/0055304 A1 | 2/2013 | Kirby et al. |
| 2013/0055305 A1 | 2/2013 | Martch et al. |
| 2013/0055310 A1 | 2/2013 | VanDuyn et al. |
| 2013/0055311 A1 | 2/2013 | Kirby et al. |
| 2013/0055314 A1 | 2/2013 | Martch |
| 2013/0055333 A1 | 2/2013 | Kummer |
| 2013/0216208 A1 | 8/2013 | Kummer et al. |
| 2013/0223814 A1 | 8/2013 | Casagrande |
| 2013/0243397 A1 | 9/2013 | Minnick et al. |
| 2013/0243398 A1 | 9/2013 | Templeman et al. |
| 2013/0243399 A1 | 9/2013 | Casagrande et al. |
| 2013/0243401 A1 | 9/2013 | Casagrande |
| 2013/0243402 A1 | 9/2013 | Kummer et al. |
| 2013/0243403 A1 | 9/2013 | Martch |
| 2013/0243405 A1 | 9/2013 | Templeman et al. |
| 2013/0243406 A1 | 9/2013 | Kirby |
| 2013/0247090 A1 | 9/2013 | Kummer et al. |
| 2013/0247106 A1 | 9/2013 | Martch et al. |
| 2013/0247107 A1 | 9/2013 | Templeman |
| 2013/0247111 A1 | 9/2013 | Templeman et al. |
| 2013/0247115 A1 | 9/2013 | Minnick |
| 2013/0298166 A1 | 11/2013 | Herrington et al. |
| 2013/0347037 A1 | 12/2013 | Soroushian |
| 2014/0047477 A1 | 2/2014 | VanDuyn |
| 2014/0050462 A1 | 2/2014 | Kummer et al. |
| 2014/0126889 A1 | 5/2014 | Kummer et al. |
| 2014/0130094 A1 | 5/2014 | Kirby et al. |

FOREIGN PATENT DOCUMENTS

| | | |
|---|---|---|
| EP | 1 168 347 A | 1/2002 |
| EP | 1372339 A2 | 12/2003 |
| EP | 2 018 059 A1 | 1/2009 |
| EP | 1 667 452 B1 | 11/2011 |
| WO | 2004/057610 A1 | 7/2004 |
| WO | 2008/010689 A1 | 1/2008 |
| WO | 2008/060486 A2 | 5/2008 |
| WO | 2011/027236 A1 | 10/2011 |
| WO | 2013/028824 A3 | 2/2013 |
| WO | 2013/138606 A1 | 9/2013 |
| WO | 2013/138610 A1 | 9/2013 |
| WO | 2013/138638 A1 | 9/2013 |
| WO | 2013/138689 A1 | 9/2013 |
| WO | 2013/138740 A1 | 9/2013 |

OTHER PUBLICATIONS

International Search Report and Written Opinion of PCT/US2013/32176 mailed on Jun. 25, 2013, 15 pages.
International Search Report and Written Opinion of PCT/US2013/031565 mailed May 31, 2013, 103 pages.
International Search Report and Written Opinion of PCT/US2013/031915 mailed on Jun. 3, 2013, 7 pages.
International Search Report of PCT/KR2007/003521 mailed on Oct. 23, 2007.
International Search Report of PCT/IB2003/005737 mailed on Mar. 3, 2004.
Jensen, Craig, "Fragmentation: the condition, the cause, the cure"' Online!, Executive Software International, 1994; retrieved from Internet <URL: www.executive.com/fragbook/fragbook.htm> 'retrieved on Mar. 2, 2004! * Chapter: "How a disk works", Section: "The original problem".
International Search Report and Written Opinion of PCT/US2012/51992 mailed Nov. 2, 2012, 15 pages.
International Search Report and Written Opinion of PCT/US2012/51987 mailed Oct. 23, 2012, 20 pages.
International Search Report and Written Opinion of PCT/US2012/051984 mailed Nov. 5, 2012, 13 pages.
International Search Report and Written Opinion of PCT/US2012/52002 mailed Oct. 16, 2012, 17 pages.
International Preliminary Report on Patentability for PCT/US2012/052002 mailed on Apr. 17, 2014, 10 pages.
International Search Report and Written Opinion of PCT/US2012/51964 mailed Nov. 2, 2012, 13 pages.
International Search Report and Written Opinion of PCT/US2012/052011 mailed Dec. 17, 2012, 44 pages.
International Preliminary Report on Patentability, PCT/US2012/052011, mailed on Mar. 6, 2014, 6 pages.
International Preliminary Report on Patentability, PCT/US2012/051984, mailed on Mar. 6, 2014, 8 pages.
International Preliminary Report on Patentability, PCT/US2012/051964, mailed on Apr. 10, 2014, 7 pages.
International Preliminary Report on Patentability, PCT/US2012/051992, mailed on Apr. 3, 2014, 7 pages.
International Preliminary Report on Patentability, PCT/US2012/051987, mailed on Mar. 6, 2014, 7 pages.
Author Unknown, "Move Networks is Delivering the Next Generation of Television," Move Networks, 2010, obtained online at http://movenetworks.com/, 2 pages.
Jung, J., et al., "Design and Implementation of a Multi-Stream CableCARD with a High-Speed DVB-Common Descrambler," ACM Multimedia, 2006, 4 pages.
U.S. Appl. No. 13/149,852, filed May 31, 2011, Non-Final Office Action mailed Dec. 12, 2012, 9 pages.
U.S. Appl. No. 13/149,852, filed May 31, 2011, Final Office Action mailed Mar. 26, 2013, 13 pages.
U.S. Appl. No. 13/149,852, filed May 31, 2011, Notice of Allowance mailed Jul. 11, 2013, 13 pages.
U.S. Appl. No. 13/286,157, filed Oct. 31, 2011, Non-Final Office Action mailed Jan. 17, 2013, 20 pages.
U.S. Appl. No. 13/286,157, filed Oct. 31, 2011, Non-Final Office Action mailed Jul. 25, 2013, 49 pages.
U.S. Appl. 13/286,157, filed Oct. 31, 2011, Notice of Allowance mailed Feb. 3, 2014, 81 pages.
U.S. Appl. No. 13/215,702, filed Aug. 23, 2011, Notice of Allowance mailed Feb. 11, 2013, 13 pages.
U.S. Appl. No. 13/288,002, filed Nov. 2, 2011, Non-final Office Action mailed Sep. 26, 2013, 15 pages.
U.S. Appl. No. 13/288,002, filed Nov. 2, 2011, Final Office Action mailed Mar. 27, 2014, 20 pages.
U.S. Appl. No. 13/302,852, filed Nov. 22, 2011, Non-Final Rejection mailed May 23, 2013, 19 pages.
U.S. Appl. No. 13/302,852, filed Nov. 22, 2011, Final Rejection mailed Dec. 9, 2013, 23 pages.
U.S. Appl. No. 13/324,831, filed Dec. 13, 2011 Non-Final Office Action mailed Feb. 28, 2013, 23 pages.
U.S. Appl. No. 13/324,831, filed Dec. 13, 2011 Notice of Allowance mailed Sep. 4, 2013, 22 pages.
U.S. Appl. No. 13/292,047, filed Nov. 8, 2011 Non-Final Office Action mailed Jan. 18, 2013, 17 pages.
U.S. Appl. No. 13/292,047, filed Nov. 8, 2011 Final Office Action mailed Aug. 19, 2013, 17 pages.
U.S. Appl. No. 13/614,899, filed Sep. 13, 2012 Non-Final Office Action mailed Feb. 5, 2013, 17 pages.
U.S. Appl. No. 13/614,899, filed Sep. 13, 2012, Non-Final Office Action mailed Sep. 17, 2013, 17 pages.

(56) References Cited

OTHER PUBLICATIONS

U.S. Appl. No. 13/614,899, filed Sep. 13, 2012, Final Office Action mailed Mar. 17, 2014, 41 pages.
U.S. Appl. No. 13/291,014, filed Nov. 7, 2011, Non-Final Office Action mailed Mar. 29, 2013, 21 pages.
U.S. Appl. No. 13/291,014, filed Nov. 7, 2011, Notice of Allowance mailed Aug. 7, 2013, 16 pages.
U.S. Appl. No. 13/215,598, filed Aug. 23, 2011, Non-Final Office Action mailed Jun. 20, 2013, 15 pages.
U.S. Appl. No. 13/215,598, filed Aug. 23, 2011, Final Office Action mailed Nov. 21, 2013, 23 pages.
U.S. Appl. No. 13/215,598, filed Aug. 23, 2011, Non-Final Office Action mailed Feb. 6, 2014, 12 pages.
U.S. Appl. No. 13/215,655, filed Aug. 23, 2011, Non-Final Office Action mailed Sep. 6, 2013, 27 pages.
U.S. Appl. No. 13/215,655, filed Aug 23, 2011, Final Office Action mailed Dec. 18, 2013, 20 pages.
U.S. Appl. No. 13/215,916, filed Aug. 23, 2011, Notice of Allowance mailed Jan. 4, 2013, 10 pages.
U.S. Appl. No. 13/294,005, filed Nov. 11, 2011, Non-Final Office Action mailed Aug. 14, 2013, 32 pages.
U.S. Appl. No. 13/294,005, filed Nov. 11, 2011, Final Office Action mailed Jan. 3, 2014, 29 pages.
U.S. Appl. No. 13/592,976, filed Aug. 23, 2012, Notice of Allowance mailed Oct. 7, 2013, 18 pages.
U.S. Appl. No. 13/797,173, filed Mar. 12, 2013, Non Final Office Action mailed May 15, 2014, 28 pages.
U.S. Appl. No. 13/799,653, filed Mar. 13, 2013, Non Final Office Action mailed May 8, 2014, 24 pages.
U.S. Appl. No. 13/829,350, filed Mar. 14, 2013, Non Final Office Action mailed Feb. 28, 2014, 29 pages.
U.S. Appl. No. 13/828,001, filed Mar. 14, 2013, Notice of Allowance mailed Apr. 25, 2014, 43 pages.
U.S. Appl. No. 13/799,719, filed Mar. 13, 2013, Non Final Office Action mailed Oct. 25, 2013, 79 pages.
U.S. Appl. No. 13/799,719, filed Mar. 13, 2013, Notice of Allowance mailed Apr. 23, 2014, 141 pages.
U.S. Appl. No. 14/064,423, filed Oct. 28, 2013, Non-Final Office Action mailed Dec. 20, 2013, 18 pages.
U.S. Appl. No. 14/064,423, filed Oct. 28, 2013, Notice of Allowance mailed Mar. 4, 2013, 37 pages.
U.S. Appl. No. 13/799,604, filed Mar. 13, 2013 Non Final Office Action mailed Jun. 6, 2014, 24 pages.
U.S. Appl. No. 13/614,899, filed Sep. 13, 2012 Non-Final Office Action mailed May 20, 2014, 25 pages.
U.S. Appl. No. 13/215,598, filed Aug. 23, 2011 Final Office Action mailed Jul. 2, 2014, 22 pages.
U.S. Appl. No. 13/294,005, filed Nov. 11, 2011 Non-Final Office Action mailed May 20, 2014, 33 pages.
U.S. Appl. No. 13/829,350, filed Mar. 14, 2013 Non Final Office Action mailed Jul. 29, 2014, 24 pages.
U.S. Appl. No. 13/795,914, filed Mar. 6, 2013 Notice of Allowance mailed Jul. 21, 2014, 13 pages.
U.S. Appl. No. 13/795,914, filed Mar. 6, 2013 Final Office Action mailed Apr. 3, 2014, 17 pages.
International Search Report and Written Opinion of PCT/US2013/031432 mailed May 28, 2013, 10 pages.
International Preliminary Report on Patentability for PCT/US2013/031432 issued Sep. 16, 2014, 9 pages.
International Search Report and Written Opinion of PCT/US2013/031445 mailed May 24, 2013, 11 pages.
International Preliminary Report on Patentability for PCT/US2013/031445 issued Sep. 16, 2014, 10 pages.
International Preliminary Report on Patentability for PCT/US2013/032176 mailed Sep. 25, 2014, 7 pages.
International Preliminary Report on Patentability for PCT/US2013/031565 issued Sep. 16, 2014, 18 pages.
International Preliminary Report on Patentability for PCT/US2013/031915 issued Sep. 16, 2014, 5 pages.
U.S. Appl. No. 13/302,852, filed Nov. 22, 2011 Non-Final Rejection mailed Sep. 2, 2014, 28 pages.
U.S. Appl. No. 13/793,636, filed Mar. 11, 2013 Non-Final Office Action mailed Sep. 29, 2014, 27 pages.
U.S. Appl. No. 13/800,477, filed Mar. 13, 2013 Non-Final Office Action mailed Sep. 11, 2014, 34 pages.

* cited by examiner

DESCRAMBLING OF MULTIPLE TELEVISION CHANNELS

This Application claims priority to U.S. provisional application 61/611,483, filed Mar. 15, 2012, entitled "Reception, Recording, Storage, and Manipulation of Multiple Television Channels", the entire disclosure of which is hereby incorporated by reference for all purposes.

This Application also claims priority to U.S. provisional application 61/740,807, filed Dec. 21, 2012, entitled "Descrambling of Multiple Television Channels," the entire disclosure of which is hereby incorporated by reference for all purposes.

BACKGROUND OF THE INVENTION

A television viewer may desire to watch and/or record multiple television channels at the same time. For instance, during weekday primetime, many television programs may be broadcast simultaneously on different television channels that the television viewer desires to either watch live or store for later viewing. For many cable and satellite television distribution systems, a set-top box may be used to receive, store, and display television channels on a television (or other form of display device). Such set-top boxes may have limited capabilities to concurrently display and/or store multiple television channels at the same time.

SUMMARY OF THE INVENTION

Embodiments of a television receiver are presented. The television receiver may include one or more processors. The television receiver may include a memory communicatively coupled with and readable by the one or more processors and having stored therein processor-readable instructions. The processor-readable instructions, when executed by the one or more processors, may cause the one or more processors to receive a first plurality of television channels as scrambled data packets. The processor-readable instructions may cause the one or more processors to access a network information table stored locally. The network information table may include an entry for each television channel of a second plurality of television channels. Each entry for each television channel of the second plurality of television channels may indicate at least: a first packet identifier for video packets corresponding to the television channel a second packet identifier for audio packets corresponding to the television channel, and a third packet identifier for entitlement control message packets corresponding to the television channel. The second plurality of television channels may include the first plurality of television channels. For each television channel of the first plurality of television channels, the third packet identifier in the network information table may be a same packet identifier. The processor-readable instructions may cause the one or more processors to receive an entitlement control message having the same packet identifier. The processor-readable instructions may cause the one or more processors to decrypt the entitlement control message having the same packet identifier to obtain a first control word and a second control word. The processor-readable instructions may cause the one or more processors to descramble the scrambled data packets corresponding to the first plurality of television channels using the first control word and the second control word decrypted from the entitlement control message having the same packet identifier. The processor-readable instructions may cause the one or more processors to store and/or output for presentation video and audio of each television channel of the first plurality of television channels.

Embodiments of such a television receiver may include one or more of the following: The processor-readable instructions which, when executed by the one or more processors, may further cause the one or more processors to receive data to update the network information table, wherein the update modifies at least one of the first packet identifier, the second packet identifier, and the third packet identifier corresponding to at least one television channel of the second plurality of television channels. The television receiver may receive the scrambled data packets and the entitlement control message via a satellite. The scrambled data packets for each television channel of the first plurality of television channels and the entitlement control message may be received by the television receiver from a single transponder of the satellite using a single tuner. The processor-readable instructions which, when executed by the one or more processors, further cause the one or more processors to receive additional entitlement control messages; and determine if each of the additional entitlement control messages match the entitlement control message. Processor-readable instructions which, when executed by the one or more processors, further cause the one or more processors to ignore each additional entitlement control message that matches the entitlement control message such that decryption of the additional entitlement control message does not occur.

In some embodiments, a method for descrambling multiple television channels is presented. The method may include receiving, by a television receiver, a first plurality of television channels as scrambled data packets. The method may include accessing, by the television receiver, a locally-stored network information table. The network information table may include an entry for each television channel of a second plurality of television channels. Each entry for each television channel of the second plurality of television channels may indicate at least: a first packet identifier for video packets corresponding to the television channel, a second packet identifier for audio packets corresponding to the television channel, and a third packet identifier for an entitlement control message packets corresponding to the television channel. The second plurality of television channels may include the first plurality of television channels. For each television channel of the first plurality of television channels, the third packet identifier in the network information table may be a same packet identifier. The method may include receiving, by the television receiver, an entitlement control message having the same packet identifier. The method may include decrypting, by a smartcard of the television receiver, the entitlement control message having the same packet identifier to obtain a first control word and a second control word. The method may include descrambling, by the television receiver, the scrambled data packets corresponding to the first plurality of television channels using the first control word and the second control word decrypted from the entitlement control message having the same packet identifier. Further, the method may include storing and/or outputting for presentation, by the television receiver, video and audio of each television channel of the first plurality of television channels.

Embodiments of such a method may include one or more of the following: The method may include receiving, by the television receiver, data to update the locally-stored network information table, wherein the update modifies at least one of the first packet identifier, the second packet identifier, and the third packet identifier corresponding to at least one television channel of the second plurality of television channels. The television receiver may receive the scrambled data packets and the entitlement control message via a satellite. The scrambled data packets for each television channel of the first plurality of television channels and the entitlement control message may be received by the television receiver from a single transponder of the satellite using a single tuner. The method may include periodically receiving, by the television receiver, additional entitlement control messages. The method may include determining, at the television receiver, if each of the additional entitlement control messages match the entitlement control message. The method may include ignoring, by the television receiver, each additional entitlement control message that matches the entitlement control message such that decryption of the additional entitlement control message does not occur. The method may include scrambling, by a television service provider, each television channel of the first plurality of television channels using the first control word and the second control word. The method may include providing, by the television service provider, the first control word and the second control word to a security system. The method may include receiving, from the security system by the television service provider, the entitlement control message corresponding to the first control word and the second control word. The method may include transmitting the entitlement control message to the television receiver.

In some embodiments, an apparatus for descrambling multiple television channels is presented. The apparatus may include means for receiving a first plurality of television channels as scrambled data packets. The apparatus may include means for accessing a locally-stored network information table. The network information table may include an entry for each television channel of a second plurality of television channels. Each entry for each television channel of the second plurality of television channels may indicate at least: a first packet identifier for video packets corresponding to the television channel, a second packet identifier for audio packets corresponding to the television channel, and a third packet identifier for an entitlement control message packets corresponding to the television channel. The second plurality of television channels may include the first plurality of television channels. For each television channel of the first plurality of television channels, the third packet identifier in the network information table may be a same packet identifier. The apparatus may include means for receiving an entitlement control message having the same packet identifier. The apparatus may include means for decrypting the entitlement control message having the same packet identifier to obtain a first control word and a second control word. The apparatus may include means for descrambling the scrambled data packets corresponding to the first plurality of television channels using the first control word and the second control word decrypted from the entitlement control message having the same packet identifier. The apparatus may include means for storing video and audio of each television channel of the first plurality of television channels.

Embodiments of such an apparatus may include one or more of the following: The apparatus may include means for receiving data to update the locally-stored network information table, wherein the update modifies at least one of the first packet identifier, the second packet identifier, and the third packet identifier corresponding to at least one television channel of the second plurality of television channels. The apparatus may receive the scrambled data packets and the entitlement control message via a satellite. The scrambled data packets for each television channel of the first plurality of television channels and the entitlement control message may be received by the apparatus from a single transponder of the satellite using a single tuner.

In some embodiments, a method for descrambling multiple television channels is presented. The method may include receiving, by a television receiver, a first plurality of television channels as scrambled data packets. The method may include receiving, by the television receiver, a first entitlement control message for a first television channel of the first plurality of television channels. The method may include decrypting, by a smartcard of the television receiver, the first entitlement control message to obtain a first control word and a second control word. The method may include receiving, by the television receiver, a second entitlement control message for a second television channel of the first plurality of television channels. The method may include determining, by the television receiver, the second entitlement control message for the second television channel matches the first entitlement control message for the first television channel. The method may include, based on determining the second entitlement control message for the second television channel matches the first entitlement control message for the first television channel, ignoring, by the television receiver, the second entitlement control message such that decryption of the second entitlement control message does not occur. The method may include descrambling, by the television receiver, the scrambled data packets corresponding to the first plurality of television channels using the first control word and the second control word decrypted from the first entitlement control message. The method may include storing, by the television receiver, video and audio of each television channel of the first plurality of television channels. In some embodiments, the television receiver receives the scrambled data packets, the first entitlement control message, and the second entitlement control message via a satellite.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
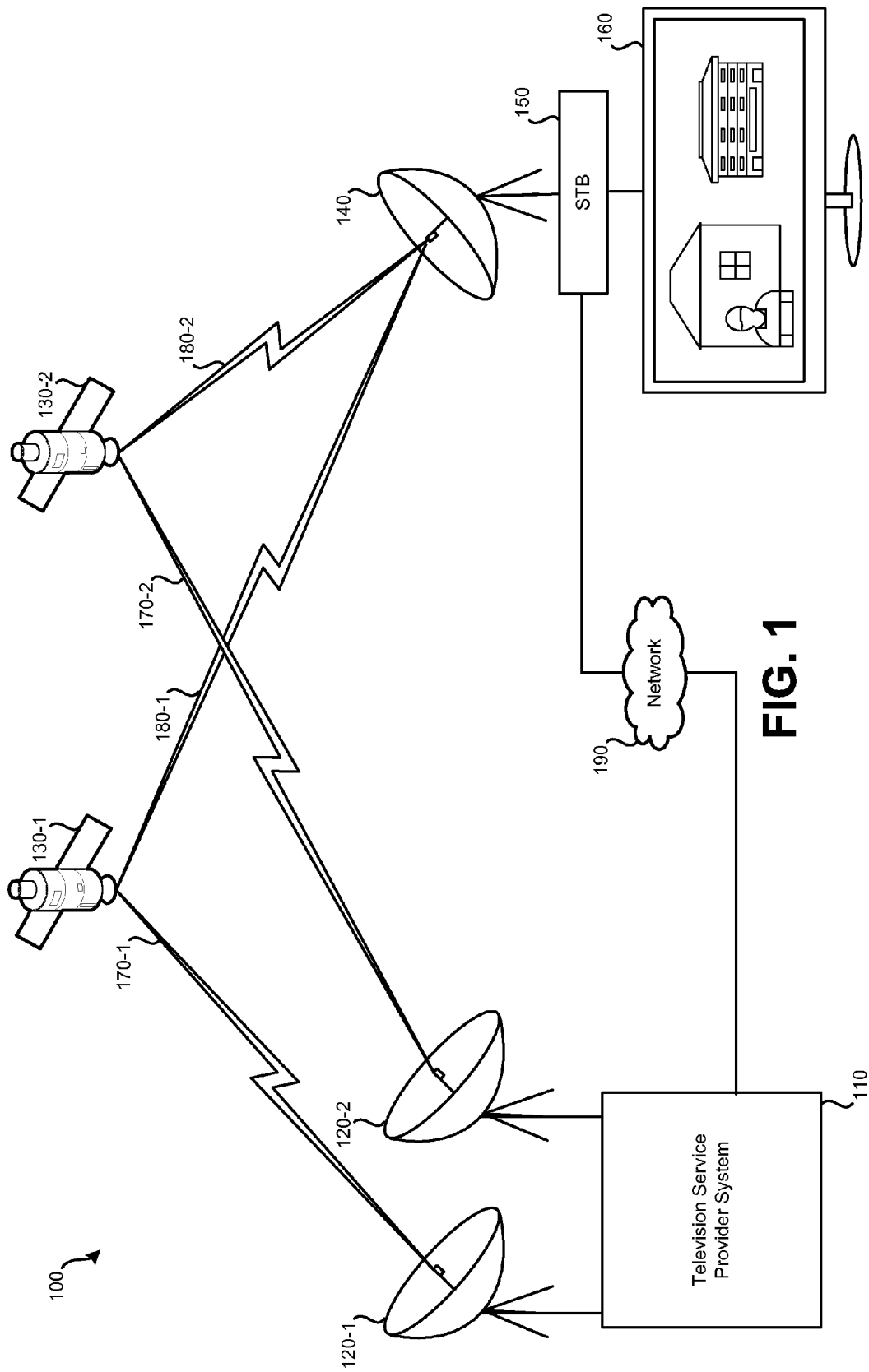
FIG. 1 illustrates an embodiment of a satellite television distribution system.

It may be beneficial for a set-top box to receive, store, and/or review multiple television channels simultaneously. For instance, during the evening primetime hours, a television subscriber (referred to as a "user") may want to view and/or store multiple television programs that are being broadcast concurrently on different television channels. As such, despite the television programs appearing on different television channels simultaneously, the user may want to store and/or view both television programs. In some situations, a user may want to store even greater amounts of programming appearing on multiple television channels simultaneously. For example, a user may desire to store all primetime television being concurrently broadcast by the major television networks (e.g., ABC, NBC, CBS, and FOX). Other situations may occur where a user may want to store and/or view multiple television channels simultaneously, such as while multiple concurrent sporting events are occurring (e.g., football on a fall Saturday or Sunday, or multiple events of the Olympics broadcast simultaneously). Another situation may be where the user's favorite television programs happen to be broadcast concurrently on different television channels.

While a user may want to record (and/or view) multiple television channels simultaneously, to do so, the user may need to dedicate television receiver hardware to the task. Typically, a single television tuner may be able to tune to one television channel at a time for viewing and/or recording. As such, if the user desired to record four television channels simultaneously, the user's television receiver (e.g., set-top box (STB)) may conventionally need to use a separate tuner to tune to each television channel. However, in certain television distribution arrangements, such as in a satellite television broadcasting arrangement, a single transponder stream may be used to transmit scrambled data corresponding to multiple television channels. Since each of these multiple television channels are transmitted using the same transponder (e.g., at the same transmission frequency), a single tuner of a television receiver may be used to receive the multiple television channels. As such, if a user desires to record four television channels that are being transmitted on the same transponder of a satellite, a single tuner at the user's television receiver may be used for all of the four television channels.

While a single tuner may be used to tune to multiple television channels being transmitted by a transponder of a television distribution satellite, these television channels may be scrambled to prevent non-subscribers from accessing the television programming. As such, in addition to receiving multiple television channels being concurrently transmitted by a transponder, a set-top box may need to descramble each television channel being simultaneously received. Transmitting television channels "concurrently" or "simultaneously" refers to data packets corresponding to the television channels being transmitted during the same time period. For example, two television programs on different television channels may be broadcast simultaneously during a given time period (e.g., 8 PM to 8:30 PM). Individual data packets for the television channels may be received at different times during this time period as part of a transponder stream. This may be complicated by several factors, such as television receiver hardware may have limited resources available for decrypting the control words (CW) used to scramble the audio and video. In some arrangements, a smart card, which may be inserted into a set-top box, may provide the decryption services. Upon the smart card receiving an entitlement control message (ECM), the ECM may be decrypted to obtain two control words (CWs) used to descramble audio and video packets corresponding to a television channel. The CW used for descrambling a television channel may change periodically, such as every ten seconds. As such, new ECMs may need to be periodically decrypted, such as once every ten seconds, to allow the STB to continuously descramble the television channel.

Decrypting a new ECM periodically, such as once every ten seconds, may be possible using the limited processing power available on a smart card. However, if multiple television channels are desired to be descrambled simultaneously, then multiple ECMs may also need to be decrypted simultaneously. The requirements of such processing may exceed the specifications of the smart card. Further, it may not be desirable to use a more capable smartcard due to the possibility of such additional processing being used by non-subscribers to gain unauthorized access to television programming.

Rather than possibly adding additional smart cards to the set-top box (which may increase price and hardware complexity), embodiments detailed herein are directed to using a single smartcard to handle decryption of multiple ECM's to extract the CW's used to descramble multiple television channels being captured by a single tuner simultaneously. In some embodiments, a networking information table (NIT) stored by a set-top box may be used to associate multiple television channels with the same ECM stream (each ECM of the stream having the same PID). As such, only a single stream of ECMs is transmitted to the STB and the single stream of ECMs is decrypted to obtain control words for multiple television channels. Accordingly, the multiple television channels may be scrambled using the same control words.

In some embodiments, rather than transmitting a single stream of ECMs for the multiple television channels being transmitted on a single transponder, each television channel is associated with its own ECM stream, as indicated by a packet identifier (PID). Each of these ECM streams may contain the same data and, thus, would be decrypted to produce the same CWs. When an ECM is provided to the smart card that is the same as the previous ECM, the smart card may recognize that the ECMs match and may not process the second ECM to output the same CWs. Alternatively, the second ECM may be processed, but the output would not be affected because the same CWs as previously output would be output again. Therefore, while each television channel may simultaneously have their own ECM streams, these ECM streams may contain the same ECMs, thus allowing only a single ECM to be decrypted by the smart card at a time and for the same CWs to be used for each television channel being received concurrently. Such an arrangement may be useful for flexibility if some television channels are to have different scrambling on a temporary basis, such as during a sporting event or during a free preview time.

FIG. 1 illustrates an embodiment of a satellite television distribution system 100. Satellite television distribution system 100 may include: television service provider system 110, satellite transmitter equipment 120, satellites 130, satellite dish 140, set-top box 150, and television 160. Alternate embodiments of satellite television distribution system 100 may include fewer or greater numbers of components. While only one satellite dish 140, set-top box 150, and television 160 (collectively referred to as "user equipment") are illustrated, it should be understood that multiple (e.g., tens, thousands, millions) instances of user equipment may receive television signals from satellites 130.

Television service provider system 110 and satellite transmitter equipment 120 may be operated by a television service provider. A television service provider may distribute television channels, on-demand programing, programming information, and/or other services to users. Television service provider system 110 may receive feeds of one or more television channels from various sources. Such television channels may include multiple television channels that contain the same content (but may be in different formats, such as highdefinition and standard-definition). To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder stream 180. Satellites 130 may be in geosynchronous orbit. Each satellite 130 may be in a different orbital slot, such that the signal path between each satellite, transmitter equipment, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite transmitter equipment 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of set-top box (STB) 150 and/or satellite dish 140, it may only be possible to capture transponder streams from a limited number of transponders concurrently. For example, a tuner of STB 150 may only be able to tune to a single transponder stream from a transponder of a single satellite at a time.

Figure 2:
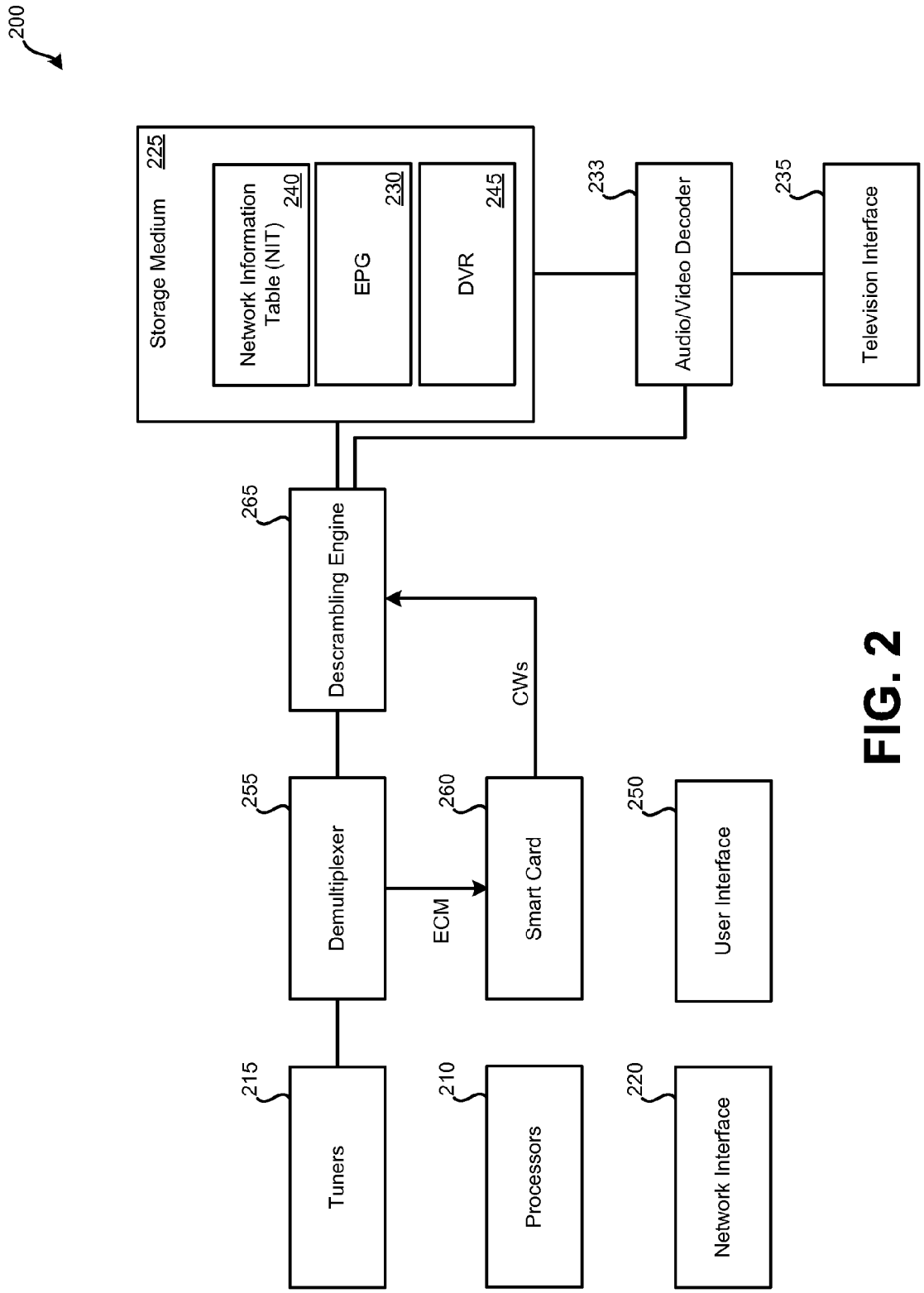
FIG. 2 illustrates an embodiment of a set-top box (STB).

In communication with satellite dish 140, may be one or more sets of receiving equipment. Receiving equipment may be configured to decode signals received from satellites 130 via satellite dish 140 for display on a display device, such as television 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of set-top box 150. As such, set-top box 150 may decode signals received via satellite dish 140 and provide an output to television 160. FIG. 2 provides additional detail of receiving equipment.

Television 160 may be used to present video and/or audio decoded by set-top box 150. Set-top box 150 may also output a display of one or more interfaces to television 160, such as an electronic programming guide (EPG). In some embodiments, a display device other than a television may be used.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a certain group of television channels, while uplink signal 170-2 contains a different grouping of television channels. Each of these television channels may be scrambled such that unauthorized persons are prevented from accessing the television channels.

Transponder stream 180-1 represents a signal between satellite 130-1 and satellite dish 140. Transponder stream 180-2 represents a signal path between satellite 130-2 and satellite dish 140. Each of transponder streams 180 may contain one or more different television channels in the form of transponder streams, which may be at least partially scrambled. For example, transponder stream 180-1 may include a first transponder stream containing a first group of television channels, while transponder stream 180-2 may include a second transponder stream containing a different group of television channels. A satellite may transmit multiple transponder streams to user equipment. For example, a typical satellite may relay 32 transponder streams via corresponding transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 1 illustrates transponder stream 180-1 and transponder stream 180-2 being received by satellite dish 140. For a first group of television channels, satellite dish 140 may receive a transponder stream of transponder stream 180-1; for a second group of channels, a transponder stream of transponder stream 180-2 may be received. STB 150 may decode the received transponder stream. As such, depending on which television channel(s) are desired, a transponder stream from a different satellite (or a different transponder of the same satellite) may be accessed and decoded by STB 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and set-top box 150. Via such a secondary communication channel, bidirectional exchange of data may occur. As such, data may be transmitted to television service provider system 110 via network 190. Data may also be transmitted from television service provider system 110 to STB 150 via network 190. Network 190 may be the Internet. While audio and video services may be provided to STB 150 via satellites 130, feedback from STB 150 to television service provider system 110 may be transmitted via network 190.

FIG. 1 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems.

FIG. 2 illustrates an embodiment of set top box 200, which may typically be in the form of a separate device configured to be connected with a presentation device, such as a television. Embodiments of STB 200 may also be referred to as a "television receiver." In addition to being in the form of an STB, a television receiver may be incorporated into another device, such as a television. For example, a television may have an integrated television receiver (which does not involve an external STB being coupled with the television). A television receiver may contain some or all of the components of STB 200 and/or may be able to perform some or all of the functions of STB 200. Accordingly, instances in this document referring to a STB and steps being performed by a STB may also be performed, more generally, by a television receiver.

FIG. 2 illustrates a block diagram of an embodiment of a set-top box 200. STB 200 may be set-top box 150 of FIG. 1, or may be incorporated as part of a television, such as television 160 of FIG. 1. STB 200 may include: processors 210, tuners 215, network interface 220, non-transitory computer-readable storage medium 225, electronic programming guide (EPG) 230, television interface 235, networking information table (NIT) 240, digital video recorder (DVR) 245, user interface 250, demultiplexer 255, smart card 260, and/or descrambling engine 265. In other embodiments of STB 200, fewer or greater numbers of components may be present. It should be understood that the various components of STB 200 may be implemented using hardware, firmware, software, and/or some combination thereof. For example, EPG 230 may be executed by processors 210.

Processors 210 may include one or more general-purpose processors configured to perform processes such as tuning to a particular channel, displaying the EPG, and/or receiving and processing input from a user. Processors 210 may include one or more special purpose processors. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by processor 210.

Tuners 215 may include one or more tuners used to tune to television channels, such as television channels transmitted via satellite or cable. Each tuner contained in tuners 215 may be capable of receiving and processing a single stream of data from a satellite transponder (or a cable RF channel) at a given time. As such, a single tuner may tune to a single transponder (or cable RF channel). If tuners 215 include multiple tuners, one tuner may be used to tune to a television channel on a first transponder for display using a television, while another tuner may be used to tune to a television channel on a second transponder for recording and viewing at some other time. Still another tuner may be used to check various television channels to determine if they are available or not. If multiple television channels transmitted on the same transponder stream are desired, a single tuner of tuners 215 may be used to receive the signal containing the multiple television channels for presentation and/or recording.

Network interface 220 may be used to communicate via an alternate communication channel with a television service provider. For example, the primary communication channel may be via satellite (which may be unidirectional to the STB) and the alternate communication channel (which may be bidirectional) may be via a network, such as the Internet. Referring back to FIG. 1, STB 150 may be able to communicate with television service provider system 110 via a network, such as the Internet. This communication may be bidirectional: data may be transmitted from STB 150 to television service provider system 110 and from television service provider system 110 to STB 150. Referring back to FIG. 2, network interface 220 may be configured to communicate via one or more networks, such as the Internet, to communicate with television service provider system 110 of FIG. 1. Information may be transmitted and/or received via network interface 220.

Storage medium 225 may represent a non-transitory computer readable storage medium. Storage medium 225 may include memory and/or a hard drive. Storage medium 225 may be used to store information received from one or more satellites and/or information received via network interface 220. Storage medium 225 may store information related to EPG 230, NIT 240, and/or DVR 245. Recorded television programs may be stored using storage medium 225.

EPG 230 may store information related to television channels and the timing of programs appearing on such television channels. EPG 230 may be stored using storage medium 225, which may be a hard drive. EPG 230 may be used to inform users of what television channels or programs are popular and/or provide recommendations to the user. EPG 230 may provide the user with a visual interface displayed by a television that allows a user to browse and select television channels and/or television programs for viewing and/or recording via DVR 245. Information used to populate EPG 230 may be received via network interface 220 and/or via satellites, such as satellites 130 of FIG. 1 via tuners 215. For instance, updates to EPG 230 may be received periodically via satellite. EPG 230 may serve as an interface for a user to control DVR 245 to enable viewing and/or recording of multiple television channels simultaneously.

Audio/video decoder 233 may serve to convert encoded video and audio into a format suitable for output to a display device. For instance, audio/video decoder 233 may receive MPEG video and audio from storage medium 225 or descrambling engine 265 to be output to a television. Audio/video decoder 233 may convert the MPEG video and audio into a format appropriate to be displayed by a television or other form of display device and audio into a format appropriate to be output from speakers, respectively.

Television interface 235 may serve to output a signal to a television (or another form of display device) in a proper format for display of video and playback of audio. As such, television interface 235 may output one or more television channels, stored television programing from storage medium 225 (e.g., DVR 245 and/or information from EPG 230) to a television for presentation.

The network information table (NIT) 240 may store information used by set-top box 200 to access various television channels. NIT 240 may be stored using storage medium 225. Information used to populate NIT 240 may be received via satellite (or cable) through tuners 215 and/or may be received via network interface 220 from the television service provider. As such, information present in NIT 240 may be periodically updated. NIT 240 may be locally-stored by STB 200 using storage medium 225. Information that may be present in NIT 240 may include: television channel numbers, a satellite identifier, a frequency identifier, a transponder identifier, an ECM PID, one or more audio PIDs, and a video PID. (A second audio PID of a channel may correspond to a second audio program (SAP), such as in another language.) In some embodiments, NIT 240 may be divided into additional tables. For example, rather than the specific audio PIDs and video PIDs being present in NIT 240, a channel identifier may be present within NIT 240 which may be used to lookup the audio PIDs and video PIDs in another table.

Table 1 provides a simplified example of NIT 240 for several television channels. It should be understood that in other embodiments, many more television channels may be represented in NIT 240. NIT 240 may be periodically updated by a television service provider. As such, television channels may be reassigned to different satellites and/or transponders, and STB 200 may be able to handle this reassignment as long as NIT 240 is updated.

TABLE 1

| Channel | Satellite | Transponder | ECM PID | Audio PIDs | Video PID |
|---|---|---|---|---|---|
| 4 | 1 | 2 | 27 | 1001 | 1011 |
| 5 | 2 | 11 | 29 | 1002 | 1012 |
| 7 | 2 | 3 | 31 | 1003 | 1013 |
| 13 | 2 | 4 | 33 | 1003, 1004 | 1013 |

It should be understood that the values provided in Table 1 are for example purposes only. Actual values, including how satellites and transponders are identified, may vary. Additional information may also be stored in NIT 240. Additional information on how NIT 240, as indicated in Table 1, may be used is provided in reference to FIG. 3. Video and/or audio for different television channels on different transponders may have the same PIDs. Such television channels may be differentiated based on which satellite and/or transponder to which a tuner is tuned.

Digital Video Recorder (DVR) 245 may permit a television channel to be recorded for a period of time. DVR 245 may store timers that are used by processors 210 to determine when a television channel should be tuned to and recorded to DVR 245 of storage medium 225. In some embodiments, a limited amount of storage medium 225 may be devoted to DVR 245. Timers may be set by the television service provider and/or one or more users of the STB. DVR 245 may be configured by a user to record particular television programs. Whether a user directly tunes to a television channel or DVR 245 tunes to a first television channel, NIT 240 may be used to determine the satellite, transponder, ECM PID (packet identifier), audio PID, and video PID.

User interface 250 may include a remote control (physically separate from STB 200) and/or one or more button on STB 200 that allows a user to interact with STB 200. User interface 250 may be used to select a television channel for viewing, view EPG 230, and/or program DVR 245.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which in combination with NIT 240, can be determined to be associated with particular television channel. Particular data packets, referred to as entitlement control messages (ECMs) may be periodically transmitted. ECMs may be encrypted; STB 200 may use smart card 260 to decrypt ECMs. Decryption of an ECM may only be possible if the user has authorization to access the particular television channel associated with the ECM. When an ECM is received by demultiplexer 255 and the ECM is determined to correspond to a television channel being stored and/or displayed, the ECM may be provided to smart card 260 for decryption.

When smart card 260 receives an encrypted ECM from demultiplexer 255, smart card 260 may decrypt the ECM to obtain some number of control words. In some embodiments, from each ECM received by smart card 260, two control words are obtained. In some embodiments, when smart card 260 receives an ECM, it compares the ECM to the previously received ECM. If the two ECMs match, the second ECM is not decrypted because the same control words would be obtained. In other embodiments, each ECM received by smart card 260 is decrypted; however, if a second ECM matches a first ECM, the outputted control words will match; thus, effectively, the second ECM does not affect the control words output by smart card 260.

When an ECM is received by smart card 260, it may take a period of time for the ECM to be decrypted to obtain the control words. As such, a period of time, such as 2 seconds, may elapse before the control words indicated by the ECM can be obtained. Smart card 260 may be permanently part of STB 200 or maybe configured to be inserted and removed from STB 200.

Demultiplexer 255 may be configured to filter data packets based on PIDs. For example, if a transponder data stream includes multiple television channels, data packets corresponding to a television channel that is not desired to be stored or displayed by the user, may be ignored by demultiplexer 255. As such, only data packets corresponding to the one or more television channels desired to be stored and/or displayed may be passed to either descrambling engine 265 or smart card 260, other data packets may be ignored. For each channel, a stream of video packets, a stream of audio packets and/or a stream of ECM packets may be present, each stream identified by a PID. In some embodiments, a common ECM stream may be used for multiple television channels. Additional data packets corresponding to other information, such as updates to NIT 240, may be appropriately routed by demultiplexer 255.

Descrambling engine 265 may use the control words output by smart card 260 in order to descramble video and/or audio corresponding to television channels for storage and/or presentation. Video and/or audio data contained in the transponder data stream received by tuners 215 may be scrambled. The video and/or audio may be descrambled by descrambling engine 265 using a particular control word. Which control word output by smart card 260 to be used for successful descrambling may be indicated by a scramble control identifier present within the data packet containing the scrambled video or audio. Descrambled video and/or audio may be output by descrambling engine 265 to storage medium 225 for storage (via DVR 245) and/or to audio/video decoder 233 for output to a television or other presentation equipment via television interface 235.

For simplicity, STB 200 of FIG. 2 has been reduced to a block diagram, commonly known parts, such as a power supply, have been omitted. Further, some routing between the various modules of STB 200 has been illustrated. Such illustrations are for exemplary purposes only. Two modules not being directly or indirectly connected does not indicate the modules cannot communicate. Rather, connections between modules of the STB 200 are intended only to indicate possible common data routing. It should be understood that the modules of STB 200 may be combined into a fewer number of modules or divided into a greater number of modules. Further, the components of STB 200 may be part of another device, such as built into a television. Also, while STB 200 may be used to receive, store, and present television channels received via a satellite, it should be understood that similar components may be used to receive, store, and present television channels via a cable network.

Figure 3:
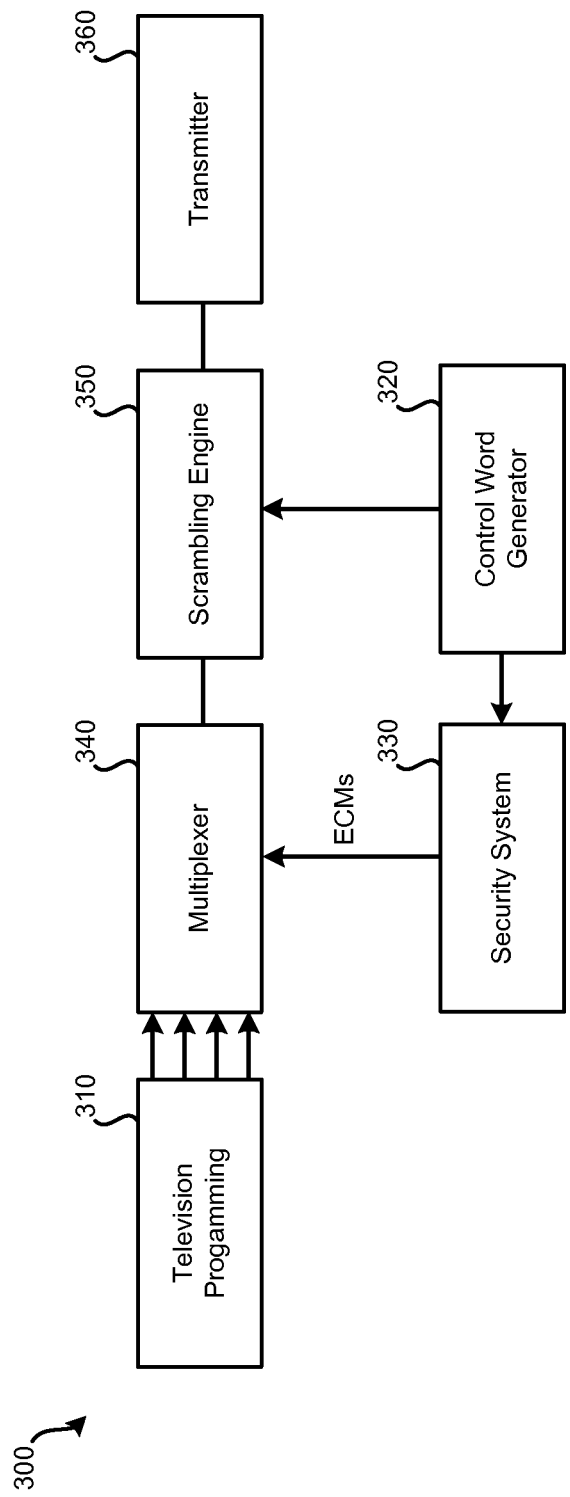
FIG. 3 illustrates an embodiment of a television service provider scrambling system.

FIG. 3 illustrates an embodiment of a television service provider scrambling system 300. Television service provider scrambling system 300 may be part of television service provider system 110 of FIG. 1. As such, before data is transmitted to set-top boxes via satellite, television service provider scrambling system 300 may be used to scramble video and/or audio packets to prevent unauthorized users from accessing television programming. Television service provider scrambling system 300 may include: television programming module 310, control word generator 320, security system 330, multiplexer 340, scrambling engine 350, and transmitter 360.

Television programming module 310 may receive television channels from multiple different sources, such as directly from the networks that produced the content on the television channels. Each television channel that is to be transmitted on a particular transponder stream via a transponder of the satellite may be provided to multiplexer 340. Multiplexer 340 may create a digital stream of data packets containing the video, audio, and other data, such as ECMs, to be transmitted on the transponder data stream. The data stream, which includes video and/or audio data packets that are not scrambled, may be passed to scrambling engine 350. Scrambling engine 350 may use a control word to scramble video or audio present in a data packet. Some audio and video packets may also pass through with no scrambling, if desired by the television service provider.

Control word generator 320 may generate the control word that is used by scrambling engine 350 to scramble the video or audio present in the data packet. Control words generated by control word generator 320 may be passed to security system 330, which may be operated by the television service provider or by a third-party security provider. The control words generated by control word generator 320 may be used by security system 330 to generate an ECM. Each ECM may indicate two control words. The control words indicated may be the current control word being used to scramble video and audio, and the control word that will next be used to scramble video and audio. Security system 330 may output an ECM to multiplexer 340 for transmission to subscribers' set-top boxes. Each data packet, whether it contains audio, video, an ECM, or some other form of data, may be associated with a particular PID. This PID may be used by the set-top box in combination with the networking information table to determine which television channel the data contained within the data packet corresponds. After video and audio contained within data packets has been scrambled by scrambling engine 350, the transponder data stream may be transmitted by transmitter 360 to a satellite, such as satellite 130-1 of FIG. 1, for relay to subscribers' set-top boxes, such as STB 150. Accordingly, the transponder data stream transmitted by transmitter 360 contains scrambled video packet stream and audio packet stream and also contains an encrypted ECM packet stream which contains the control words necessary to descramble the scrambled video and audio packets.

For simplicity, television service provider scrambling system 300 of FIG. 3 has been reduced to a block diagram, other common components have been omitted. Further, some routing between the various modules of television service provider scrambling system 300 has been illustrated. Such illustration is for exemplary purposes only. Regardless of whether two modules are directly or indirectly connected, the modules may be able to communicate. Connections between modules are intended only to indicate possible common routing. It should be understood that the modules of television service provider scrambling system 300 may be combined into a fewer number of modules or divided into a greater number of modules.

Figure 4:
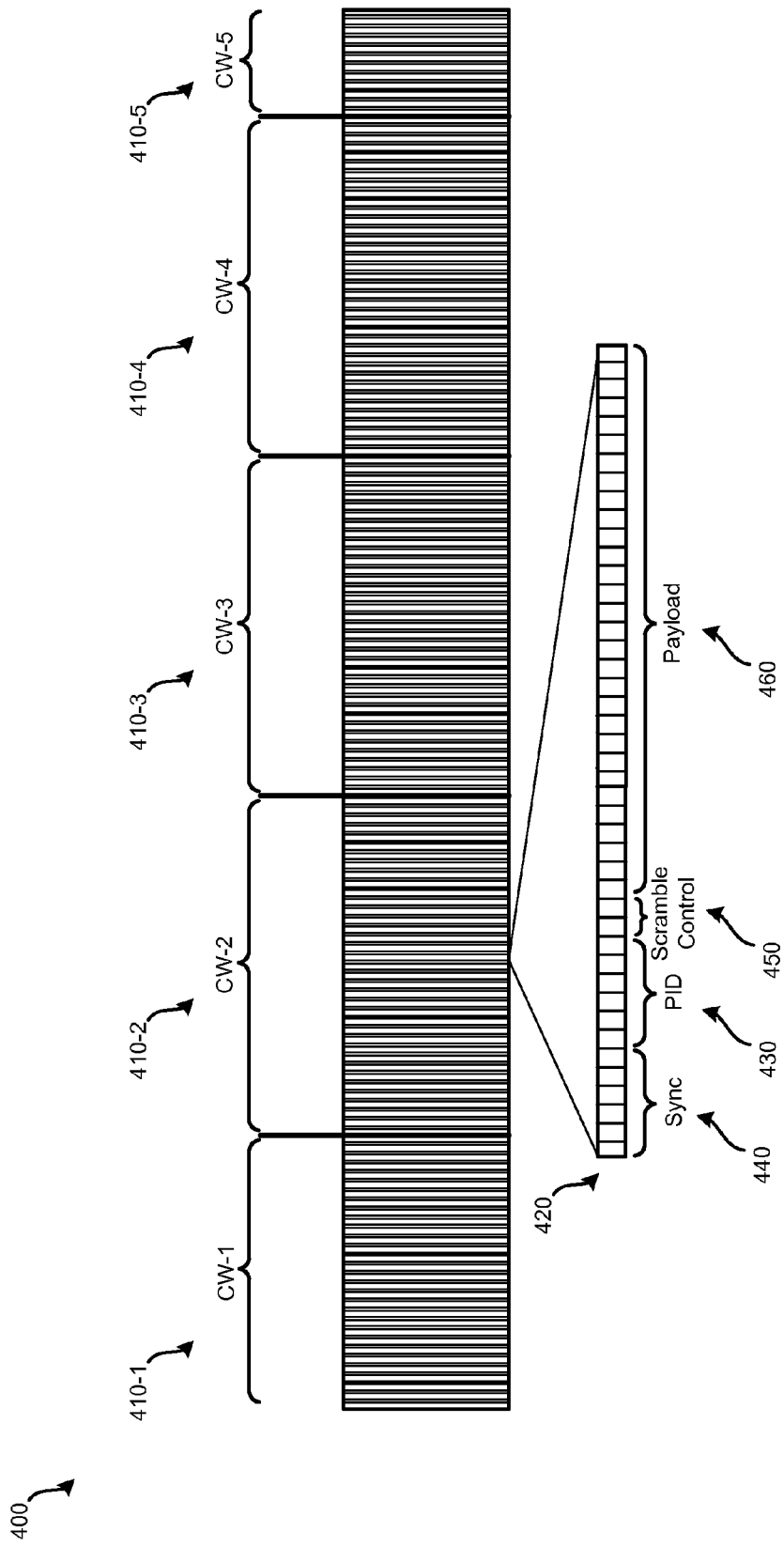
FIG. 4 illustrates an embodiment of a data transmission and scrambling scheme for satellite television channel distribution.

FIG. 4 illustrates an embodiment of a data transmission and scrambling scheme for satellite television channel distribution. In FIG. 4, a transponder data stream 400 is illustrated. At least some data contained within data packets of transponder data stream 400 are scrambled using control words. In some embodiments, at least audio and video data contained within data packets are scrambled using control words. Referring to transponder data stream 400, video and audio packets transmitted during a first time period 410-1 are scrambled using a first control word. Video and audio transmitted during a second time period 410-2 is scrambled using a second control word. Video and audio transmitted during a third time period 410-3 is scrambled using a third control word, and so on. In order to descramble video and audio received during a particular time period, the appropriate control word must be used.

Data packet 420 illustrates an exemplary video or audio packet. Data packet 420 may contain at least: sync 440, PID 430, scramble control 450, and payload 460. The packet header of the packet (which may be an MPEG packet) may include sync 440 (which may be first), PID 430, and scramble control 450. As a reference, MPEG Systems Document 13818-1 lists the specifications in detail. PID 430 may be a packet identifier used to indicate the particular television channel (or other type of data, such as an ECM) with which the data packet is associated. Multiple video packets associated with the same PID may be referred to as a video packet stream, likewise for ECMs and audio packets. Referring back to Table 1, if a particular television channel is attempting to be accessed, such as television channel four, using the NIT, the STB may be able to determine that a data packet with a PID of 1001 corresponds to audio for channel 4, a data packet with a PID of 1011 corresponds to video for channel 4, and a data packet with a PID of 27 corresponds to an ECM for channel 4. Sync 440 may contain some number of bits that are used to synchronize with the transport stream. Scramble control 450 may serve to indicate which control word, if any, should be used to descramble payload 460. In some embodiments, scramble control 450 may indicate either an even control word or an odd control word is to be used for descrambling. In a video or audio packet, payload 460 may contain scrambled video or audio, respectively.

When a data packet is received that indicates a PID corresponding to an ECM of a television channel desired to be recorded or viewed, the encrypted ECM in the payload may be passed to a smart card for decryption. As the control word used for descrambling is changed over time, so is the ECM. Each ECM may contain the currently used control word for descrambling and the control word that will be used for descrambling next. As such, an ECM may contain one control word that is the same as the previous ECM and a new control word. For example, an ECM may be represented in the format of ($CW_{odd}$, $CW_{even}$). Whether the even or the odd control word is used for descrambling may be based on the scramble control identifier present within a data packet.

During the time period 410-1 the odd control word, $CW_1$, may be used for descrambling. During this time period, the same ECM may be received multiple times (which may allow a set-top box that just tuned to the transponder stream to access television channels using the ECM's CWs as soon the ECMs are decrypted and the CW recovered). This ECM may include encrypted ($CW_1$, $CW_2$). As such, the ECM indicates the current control word ($CW_1$) and the next control word to be used ($CW_2$). During time period 410-1 data packets containing scrambled data may have scramble control bits that indicate the odd control word should be used for descrambling, as such $CW_1$ may be used for descrambling.

Starting at the beginning of time period 410-2, the scramble control bits of a data packet containing scrambled video or audio may indicate the even control word should be used, as such $CW_2$ may be used for descrambling. Once time period 410-2 begins, and control word $CW_1$ is no longer being used for scrambling, a different ECM may be transmitted to the STB that indicates the current control word and the next control word to be used. This ECM may be transmitted periodically during time period 410-2, such as every tenth of a second. In this instance, the ECM may indicate: ($CW_3$, $CW_2$). As such, the current control word $CW_2$ remains the same and continues to be used for descrambling during time period 410-2 during which the data packets indicate, via their scramble control bits, that the even control word is to be used for descrambling. When decrypted, the new ECM indicates a new odd control word, $CW_3$, which will be used for descrambling when the scramble control bits indicate the odd control word should be used for descrambling. This process may continue, with descrambling switching between the even and odd control words as long as the STB is tuned to the transponder stream. In some embodiments, the time period during which any particular control word is used may be approximately 10 seconds. Such a time period may allow ample time for a smartcard to decrypt an ECM such that the next control word to be used will be decrypted by the smart card prior to data packets being received that indicate, via the scramble control bits, that this next control word is to be used for descrambling.

Transponder data stream 400 may contain audio and video for multiple television channels, the packets of which may be indicated by different PIDs. In FIG. 4, a single CW is shown as used for discreet time periods, however it should be understood that different CWs may be decrypted from different ECMs for different television channels. As such, the illustration of CWs one through five may be for one (or more than one) television channel, while other CWs (decrypted from other ECMs) may be used for other television channels within the same transponder stream.

While data packet 420 indicates only sync 440, PID 430, scramble control 450, and payload 460 as parameters that are present, it should be understood that data may be present that corresponds to other parameters, such as other header parameters. Further, based on the embodiment, the number of bits or bytes present in scramble control 450, payload 460, PID 430, sync 440 and/or any other parameter may vary. The boxes present in data packet 420 are not intended to be representative of a particular number of bits or bytes.

Figure 5:
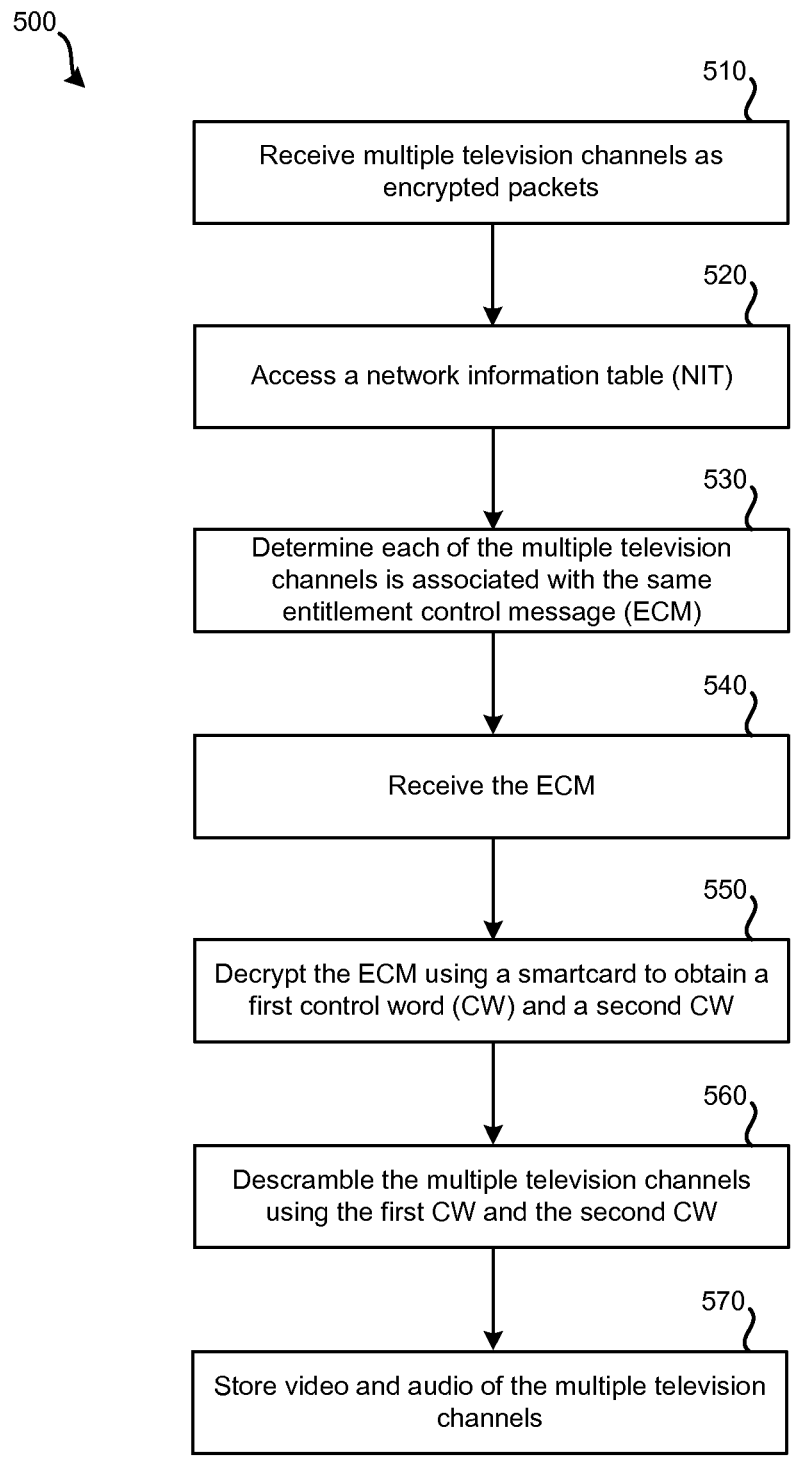
FIG. 5 illustrates an embodiment of a method for using a single entitlement control message to control concurrent access to multiple television channels.

The systems, encryption schemes, and scrambling schemes discussed in relation to FIGS. 1-4 may be used to perform various methods. FIG. 5 illustrates an embodiment of a method 500 for using a single entitlement control message to control concurrent access to multiple television channels. In method 500, a single ECM is used for descrambling of multiple television channels. As such, in method 500, multiple television channels (e.g., two or more) of a transponder data stream are being received by a single tuner of a set-top box (or other form of receiving equipment). In some embodiments, multiple tuners of a set-top box may be used. Method 500 may be performed using satellite television distribution system 100 of FIG. 1, STB 200 of FIG. 2, and television service provider scrambling system of FIG. 3. It should be understood that method 500 may also be performed using systems other than satellite television distribution system 100 of FIG. 1, STB 200 of FIG. 2, and television service provider scrambling system of FIG. 3. At least some steps of method 500 may be performed by a computer system. Some steps may be performed using one or more processors. Means for performing method 500 include components of STB 200 of FIG. 2 and, more generally, a computerized system, such as computer system 700 of FIG. 7.

At step 510, multiple television channels may be received in the form of data packets containing scrambled audio and scrambled video. Referring to FIG. 4, when a tuner of the set-top box is tuned to a particular transponder data stream being received from a particular transponder of the satellite, data packets corresponding to multiple television channels may be received. These data packets corresponding to multiple television channels may correspond to television programs being broadcast concurrently on these multiple television channels. The data packets corresponding to the audio and video may be at least partially scrambled using control words. In addition to data packets corresponding to audio and video of multiple television channels, data packets corresponding to ECMs may be received interspersed with the data packets corresponding to the audio and video. The ECMs received at step 510 may be decrypted to determine the control words necessary to descramble the audio and video data received in data packets.

At step 520, a set-top box may access a locally-stored networking information table (NIT). The networking information table may be stored locally on a non-transitory computer readable storage medium by the set-top box. The data contained in the networking information table may be received via satellite in the form of data packets. As such, just as data packets are dedicated to audio, video, and ECMs, other data packets may be dedicated to updating the networking information table. The NIT may indicate transponders, satellites, video PIDs, audio PIDs, and ECM PIDs corresponding to a television channel. (It should be understood that in various embodiments rather than using a single table, multiple tables may be used to store data, such as PIDs, indicated herein as each stored in the NIT.) As such, if a particular television channel is selected for viewing or recording, using the information present in the NIT, the set-top box may determine the particular transponder stream to which to tune, and on that transponder stream, the packet identifiers of audio, video, and ECMs associated with the television channel.

At step 530, by accessing the NIT, it may be determined that multiple television channels, each of which are to be stored and/or presented via a display device, are associated with a same ECM. Table 2 illustrates an exemplary embodiment of a simplified NIT in which multiple television channels, which are present on the same transponder stream, are associated with the same ECM.

TABLE 2

| Channel No. | Satellite | Transponder | ECM PID | Audio PIDs | Video PID |
|---|---|---|---|---|---|
| 4 | 2 | 5 | 27 | 1001 | 1011 |
| 5 | 2 | 5 | 27 | 1002 | 1012 |
| 7 | 2 | 5 | 27 | 1003 | 1013 |
| 13 | 2 | 5 | 27 | 1004, 1005 | 1014 |

It should be understood that the values provided in Table 2 are for example purposes only. Actual values, including how satellites and transponders are identified, may vary.

As such, according to Table 2, television channels 4, 5, 7, and 13 are each transmitted to the set-top box via the same satellite and the same transponder on the satellite. Thus, each of these television channels are transmitted concurrently as part of the same transponder stream to the set-top box. Each of these television channels is associated with a different audio PID and a different video PID. However, each of these television channels are associated with the same ECM PID. Therefore, in this example, for obtaining control words, only ECMs with a PID of 27 will be accessed (that is, only this ECM stream will be decrypted). For the example of Table 2, to simultaneously or concurrently display and/or store any combination of television channels 4, 5, 7 and 13, a single tuner may receive the transponder data stream from transponder 5 of satellite 2. An ECM with a PID of 27 may be used to obtain the control words in encrypted form. This ECM will be decrypted to recover the CWs for descrambling the audio and video data packets with PIDs of 1001, 1002, 1003, 1004, 1005, 1011, 1012, 1013, and 1014.

At step 540, an ECM may be received. This ECM may be received as a data packet received in the transponder data stream. Referring to the example of Table 2, the ECM may have a PID of 27. The ECM received at step 540 may be passed to a smartcard of the set-top box for decryption. If the ECM is unchanged from the previously received ECM, the smartcard may ignore the ECM. In some embodiments, for each ECM received, the ECM is decrypted to obtain two control words (or some other number of CWs).

At step 550, the ECM may be decrypted using the smartcard of the set-top box to obtain a first control word and a second control word. Since each of the multiple television channels points to ECMs having a same PID, other ECMs with different PIDs may be ignored by the STB and may not be passed to the smartcard for decryption. Accordingly, the smartcard may see only a single ECM stream for decryption similar to as if only a single television channel is being accessed rather than multiple television channels. Decryption of the ECM may take a period of time for the smartcard to perform, such as 2 seconds. A smartcard may be able to decrypt only a particular number of ECMs at a time. For instance, a smartcard may only be able to decrypt a single ECM at one time. In some embodiments, the number of ECMs which a smartcard can decrypt over a predefined period of time is limited.

At step 560, each of the multiple television channels that is desired to be viewed and/or recorded concurrently may have their corresponding audio and video data packets descrambled using the control words present in the ECM. As such, the control words in the particular ECM may be used to descramble audio and video data from multiple television channels. This single ECM stream (ECM data packets having the same PID), may be used for descrambling of the multiple television channels associated in the NIT with the PID of the ECM. Accordingly, at the television service provider, these television channels are scrambled using these same control words associated with the same ECM.

At step 570, video and audio corresponding to the multiple television channels are stored and/or presented, such as via a television. For example, one or more of the television channels may be stored for later viewing while one or more other channels are presented via a television to a user. As such, multiple television channels that are broadcast simultaneously can be received using a single tuner of the set-top box and can be descrambled using a single ECM stream which is used to determine control words for descrambling of each of the multiple television channels. In addition to recording multiple television channels concurrently, multiple television channels may be displayed concurrently, such as in a mosaic screen or picture-in-picture arrangement. As an example, nine smaller displays of television channels may be presented concurrently via a television.

Figure 6:
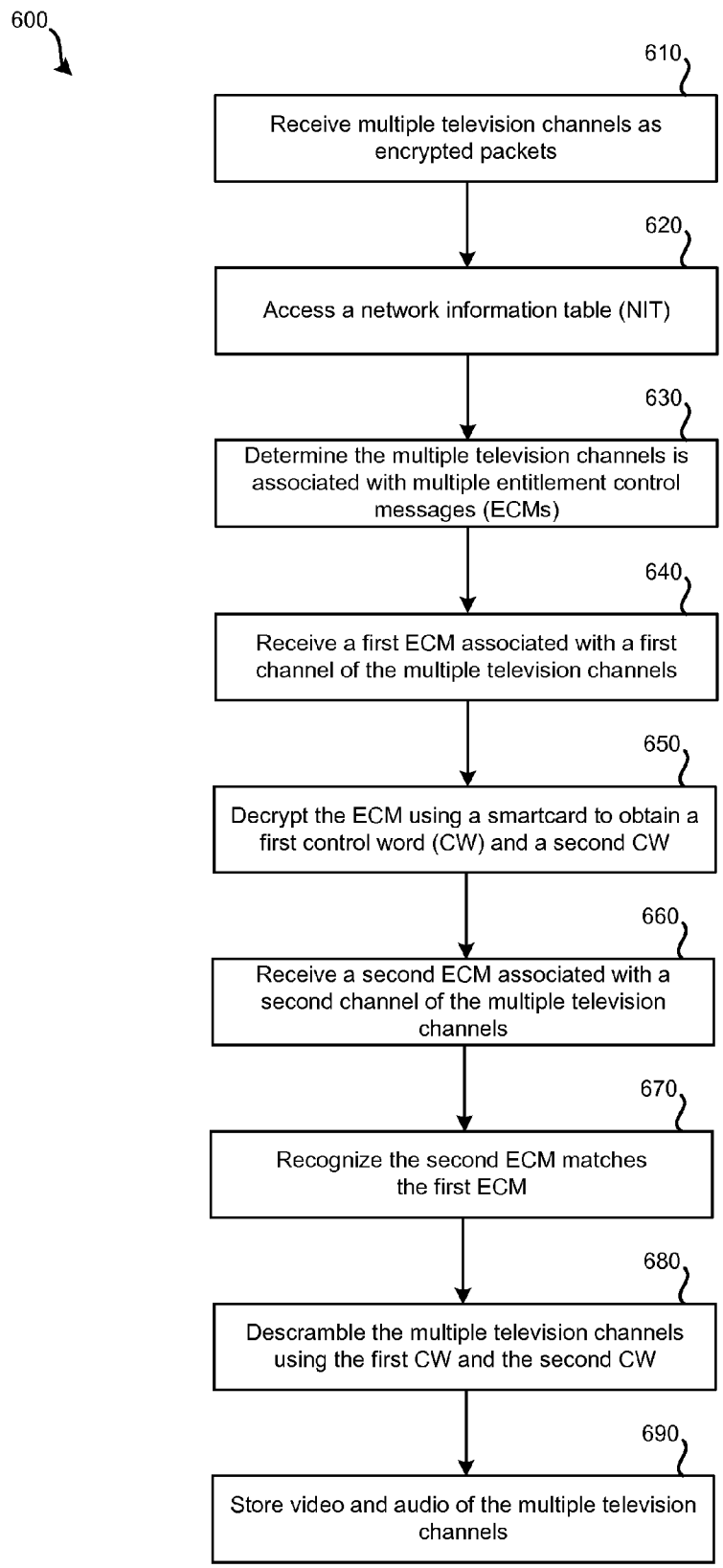
FIG. 6 illustrates an embodiment of a method for using multiple matching entitlement control messages to control concurrent access to multiple television channels.

FIG. 6 illustrates an embodiment of a method for using multiple matching entitlement control messages to control concurrent access to multiple television channels. In method 600, multiple ECMs are transmitted for the multiple television channels, such as one ECM stream for each television channel. In method 600 multiple television channels (e.g., two or more) of a transponder data stream are being received by a single tuner of a set-top box (or other form of receiving equipment). Method 600 may be performed using satellite television distribution system 100 of FIG. 1, STB 200 of FIG. 2, and television service provider scrambling system of FIG. 3. It should be understood that method 600 may also be performed using systems other than satellite television distribution system 100 of FIG. 1, STB 200 of FIG. 2, and television service provider scrambling system of FIG. 3. At least some steps of method 600 may be performed by a computer system. Some steps may be performed using one or more processors. Means for performing method 600 include components of STB 200 of FIG. 2 and, more generally, a computerized system, such as computer system 700 of FIG. 7.

At step 610, multiple television channels may be received in the form of data packets containing scrambled audio and scrambled video. These multiple television channels may be received using a single tuner of an STB. Referring to FIG. 4, when a tuner of the set-top box is tuned to a particular transponder data stream being received from a particular transponder of the satellite, data packets corresponding to multiple television channels may be received. These data packets corresponding to multiple television channels may corresponds to television program being broadcast concurrently on these multiple television channels. The data packets corresponding to the audio and video may be at least partially scrambled using control words. In addition to data packets corresponding to audio and video of multiple television channels, data packets corresponding to ECMs may be received interspersed with the data packets corresponding to the audio and video. The ECMs received at step 610 may be decrypted to determine the control words needed to descramble the audio and video received in data packets. For the multiple television channels received, a separate ECM stream may be received for each television channel. For example, referring to Table 1, a different ECM PID is present in the NIT for each television channel.

At step 620, a set-top box may access a locally-stored networking information table (NIT). The networking information table may be stored locally on a non-transitory computer readable storage medium by the set-top box. The data contained in the networking information table may be received via satellite in the form of data packets. As such, just as data packets are dedicated to audio, video, and ECMs, other data packets may be dedicated to updating the locally-stored networking information table. The NIT may indicate transponders, satellites, video PIDs, audio PIDs, and ECM PIDs corresponding to a television channel. As such, if a particular television channel is selected for viewing or recording, using the information present in the NIT, the set-top box may determine the particular transponder stream to which to tune, and on that transponder stream, the packet identifiers of audio, video, and ECMs associated with the television channel.

At step 630, by accessing the NIT, it may be determined that multiple television channels, each of which are to be stored and/or presented via a display device, are associated with multiple different ECM streams (as indicated by the ECM PIDs). Table 1 illustrates an exemplary embodiment of a simplified NIT where multiple television channels, which are present on the same transponder stream, are associated with different ECM PIDs.

At step 640, a first ECM packet may be received. This first ECM packet may be received as a data packet received in the transponder data stream and may be associated with a particular television channel. For example, referring to the exemplary NIT of Table 1, the first ECM may have a PID of 29 and thus may correspond to television channel 5. This first ECM received at step 640 may be passed to a smartcard of the set-top box for decryption. In some embodiments, the ECM is decrypted to obtain two control words.

At step 650, the first ECM may be decrypted using the smartcard of the set-top box to obtain a first control word and a second control word. Decryption of the ECM may take a period of time for the smartcard to perform, such as 2 seconds. A smartcard may be able to decrypt only a particular number of ECMs at a time. For instance, a smartcard may only be able to decrypt a single ECM at one time. In some embodiments, the number of ECMs which a smartcard can decrypt over a predefined period of time is limited.

At step 660, a second ECM packet may be received which is associated with another television channel of the multiple television channels. Referring back to the NIT of Table 1, channel 7 is associated with a ECM PID of 31. As such, when a data packet with a PID of 31 is received, the ECM contained within the data packet may be passed to the smartcard for decryption. However, in method 600, each of the ECM packets associated with the multiple channels contain the same ECM. As such, an ECM data packet may have a different PID from another ECM packet but may contain the same ECM. Effectively, the same ECM is transmitted multiple times with different PIDs. Referring to the example of the NIT of Table 1, the ECM data packet with PID of 29 contains the same ECM as the ECM data packet with the PID of 31.

In some embodiments, at step 670, when the smartcard receives this second ECM, because the second ECM matches the first ECM, the smartcard may recognize that the second ECM matches the first ECM. The match may also be determined by a processor of the set top box not part of the smartcard, such that the ECM is not provided to the smartcard. As such, no processing by the smartcard may be performed on the second ECM and the smartcard may continue to output the control words decrypted from the first ECM. As such, the second ECM may be ignored by the set top box. In other embodiments, the smartcard may decrypt the second ECM however the output of the smartcard will not change because the same control words will be decrypted from the second ECM. As such, effectively, the second ECM does not modify the control words output by the smartcard.

At step 680, each of the multiple television channels that is desired to be viewed and/or recorded concurrently may have their corresponding audio and video data packets descrambled using the control words present in the first ECM. As such, the control words in the first ECM may be used to descramble audio and video data from multiple television channels. While each television channel may have its own ECM data steam, with each ECM having a different PID for each television channel, since each of the ECMs contain the same data, the same control words are used for descrambling of the multiple television channels. After a period of time, a new ECM may be transmitted which will not match the first ECM. The smartcard may decrypt this new ECM which will match subsequent ECMs transmitted for the other television channel(s) of the multiple television channels. Accordingly, at the television service provider, each of the multiple television channels are scrambled using these same control words associated with the same ECM. This ECM is transmitted multiple times with different PIDs by the television service provider to the user's set-top box.

At step 690, video and audio corresponding to the multiple television channels are stored and/or presented, such as via a television. For example, one or more of the television channels may be stored for later viewing while one or more other channels are presented via a television to a user. As such, multiple television channels that are broadcast simultaneously can be received using a single tuner of the set-top box and can be descrambled using the control words obtained by decrypting a single ECM. In some embodiments, such multiple television channels may be transmitted using multiple transponders (and, possibly, multiple satellites). In such embodiments, multiple tuners may be required to tune to the multiple television channels, however the amount of processing required to be performed by the smart card to decrypt ECMs may be decreased. In some embodiments, ECMs for television channels may not match during specific periods of time. Such an arrangement may permit different authorizations for a special event (e.g., a pay-per-view fight). Such arrangements may be useful to reduce the frequency of changes made to an NIT.

Figure 7:
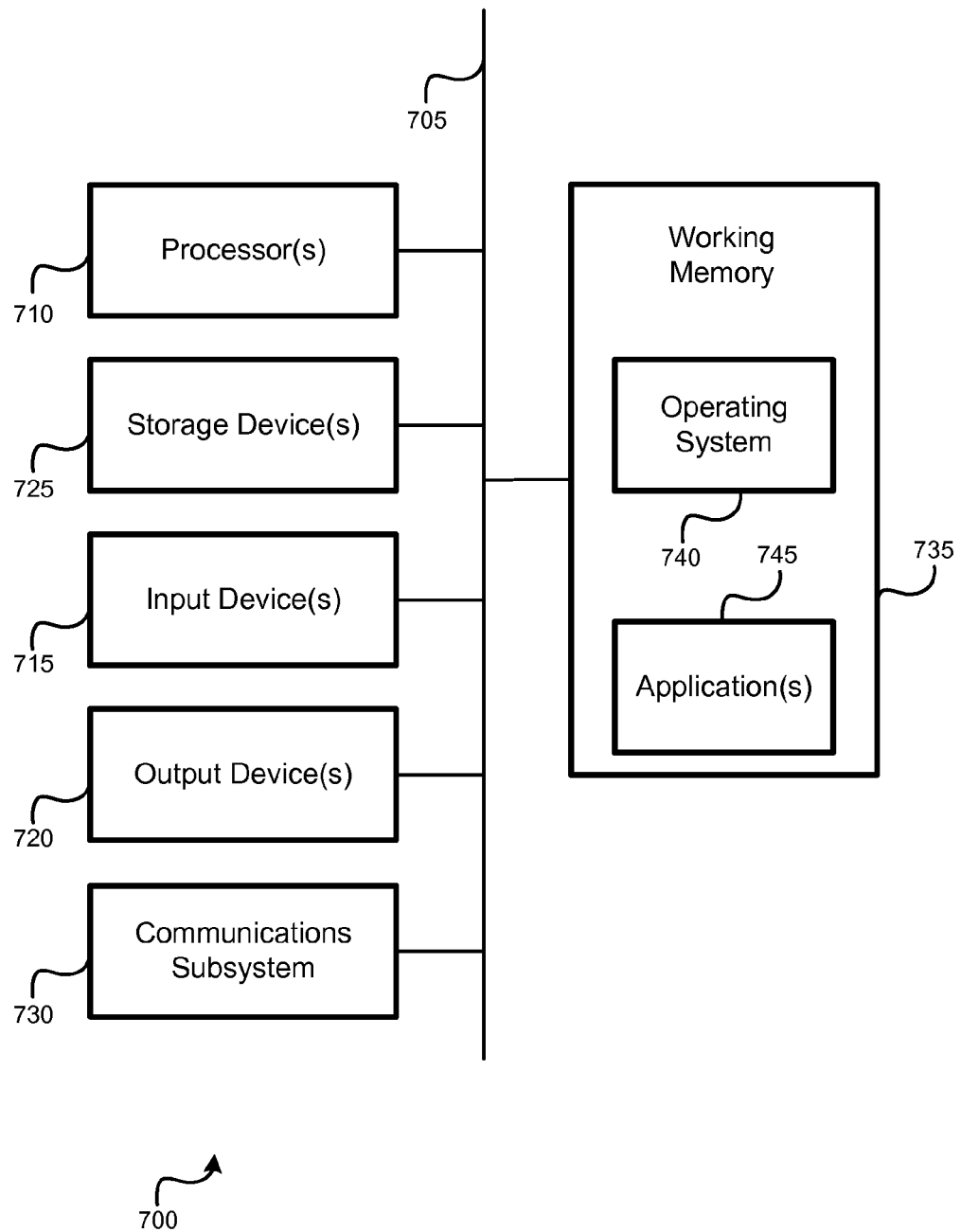
FIG. 7 illustrates an embodiment of a computer system.

A computer system as illustrated in FIG. 7 may be incorporated as part of the previously described computerized devices. For example, computer system 700 can represent some of the components of a set-top box or other form of receiver hardware. FIG. 7 provides a schematic illustration of one embodiment of a computer system 700 that can perform the methods provided by various other embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), tuners (for satellite and/or cable networks), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A television receiver, comprising:
one or more processors; and
a memory communicatively coupled with and readable by the one or more processors and having stored therein processor-readable instructions which, when executed by the one or more processors, cause the one or more processors to:
receive a first plurality of television channels as scrambled data packets;
access a network information table stored locally, wherein:
the network information table comprises an entry for each television channel of a second plurality of television channels;
each entry for each television channel of the second plurality of television channels indicates at least:
a first packet identifier for video packets corresponding to the television channel,
a second packet identifier for audio packets corresponding to the television channel, and
a third packet identifier for entitlement control message packets corresponding to the television channel; and
the second plurality of television channels comprises the first plurality of television channels;
receive a first entitlement control message;
decrypt the first entitlement control message to obtain a first control word and a second control word;
receive a second entitlement control message;
determine the second entitlement control message matches the first entitlement control message;
based on determining the second entitlement control message matches the first entitlement control message, ignoring the second entitlement control message such that decryption of the second entitlement control message does not occur;
descramble the scrambled data packets corresponding to the first plurality of television channels using the first control word and the second control word decrypted from the first entitlement control message; and
store and/or output for presentation video and audio of each television channel of the first plurality of television channels.

2. The television receiver of claim 1, wherein the processor-readable instructions which, when executed by the one or more processors, further cause the one or more processors to:
receive data to update the network information table, wherein the data modifies at least one of the first packet identifier, the second packet identifier, and the third packet identifier corresponding to at least one television channel of the second plurality of television channels.

3. The television receiver of claim 1, wherein the television receiver receives the scrambled data packets and the first entitlement control message via a satellite.

4. The television receiver of claim 3, wherein the scrambled data packets for each television channel of the first plurality of television channels, the first entitlement control message, and the second entitlement control message are received by the television receiver from a single transponder of the satellite using a single tuner.

5. The television receiver of claim 1, wherein the processor-readable instructions which, when executed by the one or more processors, further cause the one or more processors to:
receive additional entitlement control messages; and
determine if each of the additional entitlement control messages match the first entitlement control message.

6. The television receiver of claim 5, wherein processor-readable instructions which, when executed by the one or more processors, further cause the one or more processors to:
ignore each additional entitlement control message that matches the first entitlement control message such that decryption of the additional entitlement control message does not occur.

7. A method for descrambling multiple television channels, the method comprising:
receiving, by a television receiver, a first plurality of television channels as scrambled data packets;
accessing, by the television receiver, a locally-stored network information table, wherein:
the network information table comprises an entry for each television channel of a second plurality of television channels;
each entry for each television channel of the second plurality of television channels indicates at least:
a first packet identifier for video packets corresponding to the television channel,
a second packet identifier for audio packets corresponding to the television channel, and
a third packet identifier for entitlement control message packets corresponding to the television channel; and
the second plurality of television channels comprises the first plurality of television channels;
receiving, by the television receiver, a first entitlement control message;
decrypting, by a smartcard of the television receiver, the first entitlement control message to obtain a first control word and a second control word;

receiving, by the television receiver, a second entitlement control message for a second television channel of the first plurality of television channels;

determining, by the television receiver, the second entitlement control message for the second television channel matches the first entitlement control message for the first television channel;

based on determining the second entitlement control message for the second television channel matches the first entitlement control message for the first television channel, ignoring, by the television receiver, the second entitlement control message such that decryption of the second entitlement control message does not occur;

descrambling, by the television receiver, the scrambled data packets corresponding to the first plurality of television channels using the first control word and the second control word decrypted from the first entitlement control message; and storing and/or outputting for presentation, by the television receiver, video and audio of each television channel of the first plurality of television channels.

8. The method for descrambling multiple television channels of claim 7, further comprising:
receiving, by the television receiver, data to update the locally-stored network information table, wherein the data is used to modify at least one of the first packet identifier, the second packet identifier, and the third packet identifier corresponding to at least one television channel of the second plurality of television channels.

9. The method for descrambling multiple television channels of claim 7, wherein the television receiver receives the scrambled data packets and the first entitlement control message via a satellite.

10. The method for descrambling multiple television channels of claim 9, the scrambled data packets for each television channel of the first plurality of television channels and the first entitlement control message are received by the television receiver from a single transponder of the satellite using a single tuner.

11. The method for descrambling multiple television channels of claim 7, further comprising:
periodically receiving, by the television receiver, additional entitlement control messages; and
determining, at the television receiver, if each of the additional entitlement control messages match the first entitlement control message.

12. The method for descrambling multiple television channels of claim 11, further comprising:
ignoring, by the television receiver, each additional entitlement control message that matches the first entitlement control message such that decryption of the additional entitlement control message does not occur.

13. The method for descrambling multiple television channels of claim 7, further comprising:
scrambling, by a television service provider, each television channel of the first plurality of television channels using the first control word and the second control word.

14. The method for descrambling multiple television channels of claim 13, further comprising:
providing, by the television service provider, the first control word and the second control word to a security system;
receiving, from the security system by the television service provider, the first entitlement control message corresponding to the first control word and the second control word; and transmitting the first entitlement control message to the television receiver.

15. An apparatus for descrambling multiple television channels, the apparatus comprising:
means for receiving a first plurality of television channels as scrambled data packets;
means for accessing a locally-stored network information table, wherein:
the network information table comprises an entry for each television channel of a second plurality of television channels;
each entry for each television channel of the second plurality of television channels indicates at least:
a first packet identifier for video packets corresponding to the television channel,
a second packet identifier for audio packets corresponding to the television channel, and
a third packet identifier for entitlement control message packets corresponding to the television channel; and
the second plurality of television channels comprises the first plurality of television channels;
means for receiving a first entitlement control message;
means for decrypting the first entitlement control message for a first television channel of the first plurality of television channels to obtain a first control word and a second control word;
means for receiving a second entitlement control message for a second television channel of the first plurality of television channels;
means for determining the second entitlement control message for the second television channel matches the first entitlement control message for the first television channel;
means for ignoring the second entitlement control message such that decryption of the second entitlement control message does not occur based on determining the second entitlement control message for the second television channel matches the first entitlement control message for the first television channel;
means for descrambling the scrambled data packets corresponding to the first plurality of television channels using the first control word and the second control word decrypted from the first entitlement control message; and
means for storing video and audio of each television channel of the first plurality of television channels.

16. The apparatus for descrambling multiple television channels of claim 15, further comprising:
means for receiving data to update the locally-stored network information table, wherein the update modifies at least one of the first packet identifier, the second packet identifier, and the third packet identifier corresponding to at least one television channel of the second plurality of television channels.

17. The apparatus for descrambling multiple television channels of claim 15, wherein the apparatus receives the scrambled data packets, the first entitlement control message, and the second entitlement control message via a satellite.

18. The apparatus for descrambling multiple television channels of claim 17, the scrambled data packets for each television channel of the first plurality of television channels and the first entitlement control message are received by the apparatus from a single transponder of the satellite using a single tuner.

19. A method for descrambling multiple television channels, the method comprising:
- receiving, by a television receiver, a first plurality of television channels as scrambled data packets;
- receiving, by the television receiver, a first entitlement control message for a first television channel of the first plurality of television channels;
- decrypting, by a smartcard of the television receiver, the first entitlement control message to obtain a first control word and a second control word;
- receiving, by the television receiver, a second entitlement control message for a second television channel of the first plurality of television channels;
- determining, by the television receiver, the second entitlement control message for the second television channel matches the first entitlement control message for the first television channel;
- based on determining the second entitlement control message for the second television channel matches the first entitlement control message for the first television channel, ignoring, by the television receiver, the second entitlement control message such that decryption of the second entitlement control message does not occur;
- descrambling, by the television receiver, the scrambled data packets corresponding to the first plurality of television channels using the first control word and the second control word decrypted from the first entitlement control message; and
- storing, by the television receiver, video and audio of each television channel of the first plurality of television channels.

20. A method for descrambling multiple television channels of claim 19, wherein the television receiver receives the scrambled data packets, the first entitlement control message, and the second entitlement control message via a satellite.

* * * * *